US012366163B2

(12) United States Patent
Hanna et al.

(10) Patent No.: US 12,366,163 B2
(45) Date of Patent: *Jul. 22, 2025

(54) SUPPORT FOR DRILLING AND BOLTING TOOL

(71) Applicant: Joy Global Underground Mining LLC, Warrendale, PA (US)

(72) Inventors: Peter Hanna, Stanwell Tops (AU); Callum Tyler, Keiraville (AU); Brad Neilson, Mount Keira (AU)

(73) Assignee: JOY GLOBAL UNDERGROUND MINING LLC, Warrendale, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,754

(22) Filed: Apr. 26, 2023

(65) Prior Publication Data

US 2024/0093606 A1 Mar. 21, 2024

Related U.S. Application Data

(63) Continuation of application No. 17/556,707, filed on Dec. 20, 2021, now Pat. No. 11,668,193, which is a (Continued)

(51) Int. Cl.

| | |
|---|---|
| ***E21D 20/00*** | (2006.01) |
| ***B66C 23/70*** | (2006.01) |
| ***E21B 7/02*** | (2006.01) |

(52) U.S. Cl.

CPC ............ *E21D 20/003* (2013.01); *E21B 7/025* (2013.01); *B66C 23/701* (2013.01); *B66C 23/702* (2013.01); *E21B 7/022* (2013.01)

(58) Field of Classification Search

CPC ... E21D 20/003; E21B 17/022; E21B 17/025; E21B 7/022; E21B 7/025; B66C 23/701; B66C 23/702

See application file for complete search history.

(56) References Cited

U.S. PATENT DOCUMENTS

| | | |
|---|---|---|
| 2,581,667 A | 1/1952 | Joy |
| 2,690,896 A | 10/1954 | Bissell et al. |

(Continued)

FOREIGN PATENT DOCUMENTS

| | | | |
|---|---|---|---|
| AU | 2006235837 A1 | 11/2006 | |
| CN | 104955763 A * | 9/2015 | ............ B66C 13/12 |

(Continued)

OTHER PUBLICATIONS

Sandvik, "Sandvik DL331-5 Underground Drill Rig," Technical Specification 7-6360-A, Jul. 26, 2011, 4 pages.

(Continued)

*Primary Examiner* — Frederick L Lagman

(74) *Attorney, Agent, or Firm* — Husch Blackwell LLP

(57) ABSTRACT

A boom for supporting a drilling and bolting tool includes a first portion including a first end and a second end, a longitudinal axis extending between the first end and the second end; a second portion including a proximal end and a distal end, the proximal end supported for translational movement relative to the first portion in a direction parallel to the longitudinal axis, the distal end configured to support the drilling and bolting tool; an actuator for moving the second portion relative to the first portion parallel to the longitudinal axis; and a fluid passage for conveying pressurized fluid between the first end of the first portion and the drilling and bolting tool adjacent the distal end of the second portion, the fluid passage positioned within the first portion and the second portion.

20 Claims, 23 Drawing Sheets

Related U.S. Application Data continuation of application No. 16/901,873, filed on Jun. 15, 2020, now Pat. No. 11,203,933, which is a continuation of application No. 16/219,756, filed on Dec. 13, 2018, now Pat. No. 10,683,753.

(60) Provisional application No. 62/598,225, filed on Dec. 13, 2017.

(56) References Cited

U.S. PATENT DOCUMENTS

| | | | | |
|---|---|---|---|---|
| 3,061,023 | A | 10/1962 | Samhammer et al. | |
| 3,207,044 | A | 9/1965 | Hall | |
| 3,218,893 | A | 11/1965 | Madison et al. | |
| 3,316,983 | A | 5/1967 | Goodman | |
| 3,404,920 | A | 10/1968 | Tabor | |
| 3,439,925 | A | 4/1969 | Sampson | |
| 3,840,128 | A | 10/1974 | Swoboda et al. | |
| 3,849,995 | A | 11/1974 | Jamison | |
| 3,920,084 | A | 11/1975 | Russell, Jr. | |
| 4,158,520 | A | 6/1979 | Prebensen | |
| 4,215,953 | A | 8/1980 | Perraud | |
| 4,217,987 | A | 8/1980 | Gattu et al. | |
| 4,258,853 | A | 3/1981 | Gill et al. | |
| 4,300,594 | A | 11/1981 | Bacardit | |
| 4,344,599 | A | 8/1982 | Herron | |
| 4,364,540 | A | 12/1982 | Montabert | |
| 4,441,761 | A | 4/1984 | Fields et al. | |
| 4,498,544 | A | 2/1985 | Molin | |
| 5,310,011 | A | 5/1994 | Kaakkurivaara | |
| 5,924,837 | A * | 7/1999 | Passmann | B66C 23/701 414/718 |
| 5,954,143 | A | 9/1999 | Mccabe et al. | |
| 6,105,684 | A | 8/2000 | Pointer et al. | |
| 6,364,142 | B1 * | 4/2002 | Kaspar | B66C 23/705 212/231 |
| 8,061,449 | B2 | 11/2011 | Haglund | |
| 8,950,822 | B2 | 2/2015 | Niederriter et al. | |
| 9,580,966 | B2 | 2/2017 | Rudinec | |
| 10,683,753 | B2 | 6/2020 | Hanna et al. | |
| 11,203,933 | B2 | 12/2021 | Hanna et al. | |
| 11,668,193 | B2 * | 6/2023 | Hanna | E21D 20/003 405/259.1 |
| 2003/0205547 | A1 * | 11/2003 | Dupre | B66C 13/12 212/349 |
| 2007/0068583 | A1 | 3/2007 | Johnson et al. | |
| 2009/0044645 | A1 | 2/2009 | Buescher | |
| 2011/0042116 | A1 | 2/2011 | Voimanen | |
| 2015/0218946 | A1 | 8/2015 | Vogel et al. | |
| 2017/0114594 | A1 | 4/2017 | Anttonen et al. | |
| 2018/0010454 | A1 | 1/2018 | Holdsworth et al. | |
| 2018/0119492 | A1 | 5/2018 | Nelson | |
| 2020/0001593 | A1 | 1/2020 | Fukakusa et al. | |

FOREIGN PATENT DOCUMENTS

| | | | | | |
|---|---|---|---|---|---|
| CN | 107021424 | B | * | 9/2019 | B66C 23/701 |
| CN | 111094687 | A | * | 5/2020 | B25D 17/28 |
| EP | 434652 | A1 | | 6/1991 | |
| EP | 525186 | A1 | | 2/1993 | |
| EP | 434652 | B1 | | 11/1994 | |
| EP | 3059382 | A1 | | 8/2016 | |
| EP | 3059382 | B1 | | 10/2017 | |
| EP | 4336014 | A3 | | 5/2024 | |
| WO | 2019048093 | A1 | | 3/2019 | |
| WO | 2019048094 | A1 | | 3/2019 | |
| WO | 2019118784 | A1 | | 6/2019 | |

OTHER PUBLICATIONS

International Preliminary Report on Patentability for Application No. PCT/US2018/065553 dated Jun. 25, 2020 (11 pages).

International Search Report and Written Opinion for Application No. PCT/US2018/065553 dated Mar. 6, 2019 (16 pages).

Chilean Patent Office Action and Search Report for Application No. 202001593 dated May 14, 2021 (23 pages including brief English summary).

European Patent Office Extended Search Report for Application No. 18887821.9 dated Jul. 23, 2021 (9 pages).

Australian Patent Office Action for Related Application No. 2018383674 dated Dec. 20, 2022 (3 pages).

Australian Patent Office Action for Related Application No. 2018383674 dated Aug. 7, 2023 (4 pages).

Chilean Patent Office Action and Search Report for Application No. 202001593 dated Nov. 12, 2021 (30 pages).

Mexican Patent Office Action for Application No. MX/a/2020/006301 dated Nov. 15, 2023 (4 pages).

Peruvian Technical Report for Application No. 769-2020, dated Sep. 13, 2024, 6 Pages.

Australian Patent Office Action for Related Application No. 2024202104 dated Apr. 10, 2025 (3 pages).

* cited by examiner

SUPPORT FOR DRILLING AND BOLTING TOOL

REFERENCE TO RELATED APPLICATIONS

This application is a continuation of U.S. patent application Ser. No. 17/556,707, filed Dec. 20, 2021, now U.S. Pat. No. 11,668,193, which is a continuation of U.S. patent application Ser. No. 16/901,873, filed Jun. 15, 2020, now U.S. Pat. No. 11,203,933, which is a continuation of U.S. patent application Ser. No. 16/219,756, filed Dec. 13, 2018, now U.S. Pat. No. 10,683,753, which claims the benefit of U.S. Provisional Patent Application No. 62/598,225, filed Dec. 13, 2017, the entire contents of which are incorporated by reference.

FIELD AND BACKGROUND

The present disclosure relates to drill rigs, such as a drilling and bolting tool for forming a hole and/or inserting a bolt into a hole in a rock surface.

Drilling and bolting rigs may include an extendable frame and a drive unit movable along the frame for inserting a drill bit or bolt into a rock surface. Components of a drilling and bolting rig are typically actuated by fluid power (e.g., hydraulic power), requiring complicated fluid power systems as well as fluid conduits or hoses to be connected to the drilling and bolting rig.

SUMMARY

In one independent aspect, a boom for supporting a drilling and bolting tool includes: a first portion including a first end and a second end, a longitudinal axis extending between the first end and the second end; a second portion including a proximal end and a distal end, the proximal end supported for translational movement relative to the first portion in a direction parallel to the longitudinal axis, the distal end configured to support the drilling and bolting tool; an actuator for moving the second portion relative to the first portion parallel to the longitudinal axis; and a fluid passage for conveying pressurized fluid between the first end of the first portion and the drilling and bolting tool adjacent the distal end of the second portion, the fluid passage positioned within the first portion and the second portion.

In some aspects, the actuator includes a threaded shaft oriented substantially parallel to the longitudinal axis, and the actuator further includes a coupler threadably engaging the threaded shaft and coupled to the second portion, rotation of one of the threaded shaft and the coupler causing the coupler to move along the threaded shaft, thereby moving the second portion in a direction parallel to the longitudinal axis.

In some aspects, the one of the threaded shaft and the coupler is driven by an electric motor.

In some aspects, the actuator includes an elongated guide member secured to the first portion and oriented substantially parallel to the longitudinal axis, the guide member engaging the second portion to guide the second portion for movement relative to the first portion.

In some aspects, the second portion further includes an elongated shaft and a shaft support, and the shaft support includes at least one bearing engaging an inner surface of the first portion and supporting the shaft relative to the first portion.

In some aspects, the shaft support includes a body, an inner shaft positioned at least partially within the body, and a piston slidably engaging an outer surface of the inner shaft, movement of the piston relative to the inner shaft driving the inner shaft to rotate about its longitudinal axis relative to the body.

In some aspects, the boom further includes: a rotary flow distributor positioned within the first portion and in fluid communication with a fluid source; and a plurality of conduits extending between the rotary flow distributor and the second end of the second portion, the plurality of conduits extending through the shaft support and the shaft.

In some aspects, the boom further includes a rotary actuator and flow distributor secured to the second end of the second portion, the rotary actuator and flow distributor supporting the drilling and bolting tool.

In some aspects, the boom further includes: a chain including a plurality of interconnected links, the chain forming a hollow passage; and a fluid conduit for conveying fluid between an outlet of the rotary actuator and flow distributor and the drilling and bolting tool, the fluid conduit at least partially positioned in the hollow passage.

In some aspects, the first portion has a non-circular cross-section as viewed along the longitudinal axis.

In some aspects, the boom further includes: a support bracket supporting the first end of the first portion for pivoting movement; a first rotary flow distributor permitting transfer of fluid while the first portion is pivoted about a first pivot axis; a second rotary flow distributor permitting transfer of fluid while the first portion is pivoted about a second pivot axis oriented perpendicular to the first pivot axis; and a third rotary flow distributor permitting transfer of fluid while the first portion is pivoted about a third pivot axis oriented perpendicular to the first pivot axis and the second pivot axis.

In another independent aspect, a drilling and bolting device includes a tool and a boom. The tool includes a base frame, a feed frame supported for translational movement relative to the base frame, and a rotation unit supported for translational movement relative to the base frame and the feed frame. The boom includes: a first portion including a first end and a second end, a longitudinal axis extending between the first end and the second end; a second portion including a proximal end and a distal end, the proximal end supported for translational movement relative to the first portion in a direction parallel to the longitudinal axis; a rotary actuator and flow distributor secured to the distal end of the second portion and supporting the tool; an actuator for moving the second portion relative to the first portion, and a fluid passage for conveying pressurized fluid between the first end of the first portion and the distal end of the second portion, the fluid passage positioned within the first portion and the second portion.

In some aspects, the actuator includes a threaded shaft oriented substantially parallel to the longitudinal axis, and the actuator further includes a coupler threadably engaging the threaded shaft and coupled to the second portion, rotation of one of the threaded shaft and the coupler causing the coupler to move along the threaded shaft, thereby moving the second portion in a direction parallel to the longitudinal axis.

In some aspects, the actuator includes an elongated guide member secured to the first portion and oriented substantially parallel to the longitudinal axis, and the guide member engaging the second portion to guide the second portion for movement relative to the first portion.

In some aspects, the second portion further includes an elongated shaft and a shaft support, and the shaft support includes at least one bearing engaging an inner surface of the first portion and supporting the shaft relative to the first portion.

In some aspects, the shaft support includes a body, an inner shaft positioned at least partially within the body, and a piston slidably engaging an outer surface of the inner shaft, movement of the piston relative to the inner shaft driving the inner shaft to rotate about its longitudinal axis relative to the body.

In some aspects, the drilling and bolting device further includes: a rotary flow distributor positioned within the first portion and in fluid communication with a fluid source; and a plurality of conduits extending between the rotary flow distributor and the second end of the second portion, the plurality of conduits extending through the shaft support and the shaft.

In some aspects, the first portion has a non-circular cross-section as viewed along the longitudinal axis.

In yet another independent aspect, a boom for supporting a drilling and bolting tool includes: a plurality of actuators oriented parallel to one another, and a tube oriented parallel to the longitudinal axis and positioned laterally between the actuators, the tube including at least one fluid passage for conveying pressurized fluid between the first end of each housing and the distal end of each rod. Each of the actuators includes an elongated housing including a first end and a second end, the housing oriented parallel to a longitudinal axis; and a rod including a proximal end and a distal end, the proximal end supported for translational movement relative to the elongated housing in a direction parallel to the longitudinal axis, the distal end configured to support the drilling and bolting tool.

In some aspects, the boom further includes a rotary actuator and flow distributor secured to the second end of the second portion, and the rotary actuator and flow distributor supports the drilling and bolting tool.

Other aspects will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, aspects of the invention may be implemented in software (for example, stored on non-transitory computer-readable medium) executable by one or more processing units, such as a microprocessor, an application specific integrated circuits ("ASICs"), or another electronic device. As such, it should be noted that a plurality of hardware and software based devices, as well as a plurality of different structural components may be utilized to implement the invention. For example, "controllers" described in the specification may include one or more electronic processors or processing units, one or more computer-readable medium modules, one or more input/output interfaces, and various connections (for example, a system bus) connecting the components.

Figure 1:
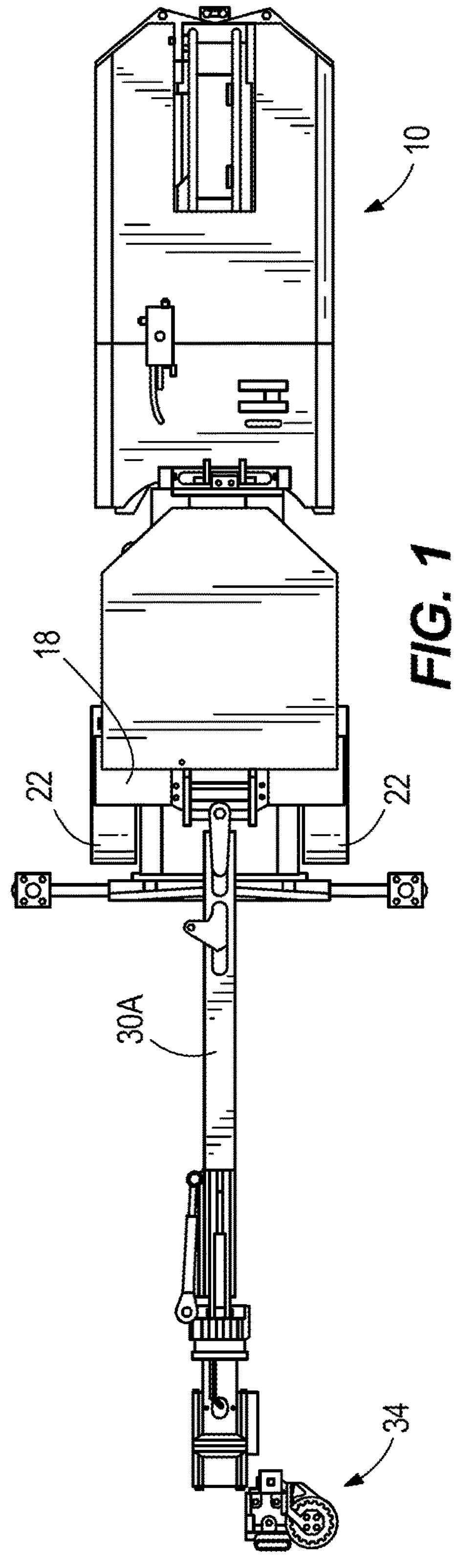
FIG. 1 is a plan view of a mobile machine.
Figure 2:
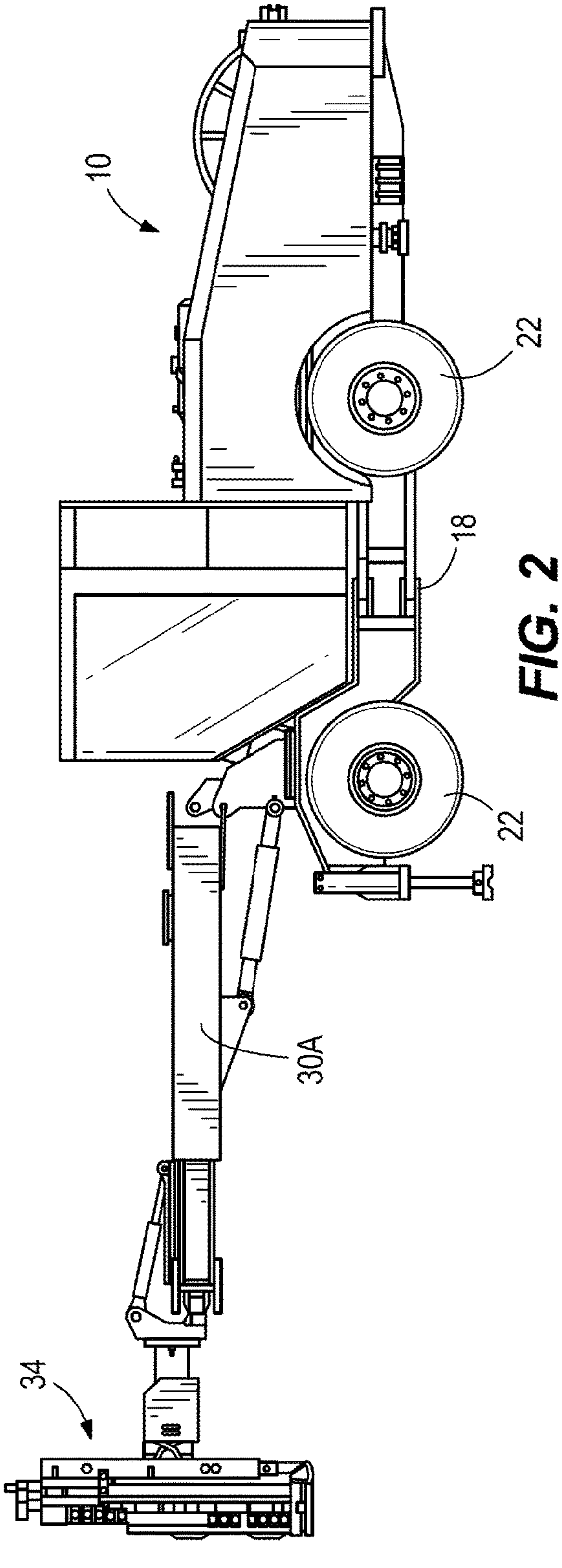
FIG. 2 is a side view of the mobile machine of FIG. 1.

FIGS. 1 and 2 illustrate a mobile mining machine 10, such as a drill jumbo or bolting machine. In the illustrated embodiment, the machine 10 includes a frame or chassis 18 supported by traction drive members 22 (e.g., wheels), and a support member or boom 30A coupled to the chassis 18. The boom 30A supports a drilling and bolting rig, or drill tool 34, for forming holes in a mine surface (e.g., a roof, a floor, or a rib or side wall—not shown) and/or installing a drill element (e.g., a bit or a bolt—not shown). In the illustrated embodiment, the drill tool 34 performs both drilling and bolting operations. Among other things, an installed bolt may anchor or support a safety mesh (not shown) to protect personnel against rock that may fall or become dislodged from the mine surface. In other embodiments, the drill tool 34 may be mounted on another type of mining machine, such as a continuous mining machine (not shown).

Figure 3:
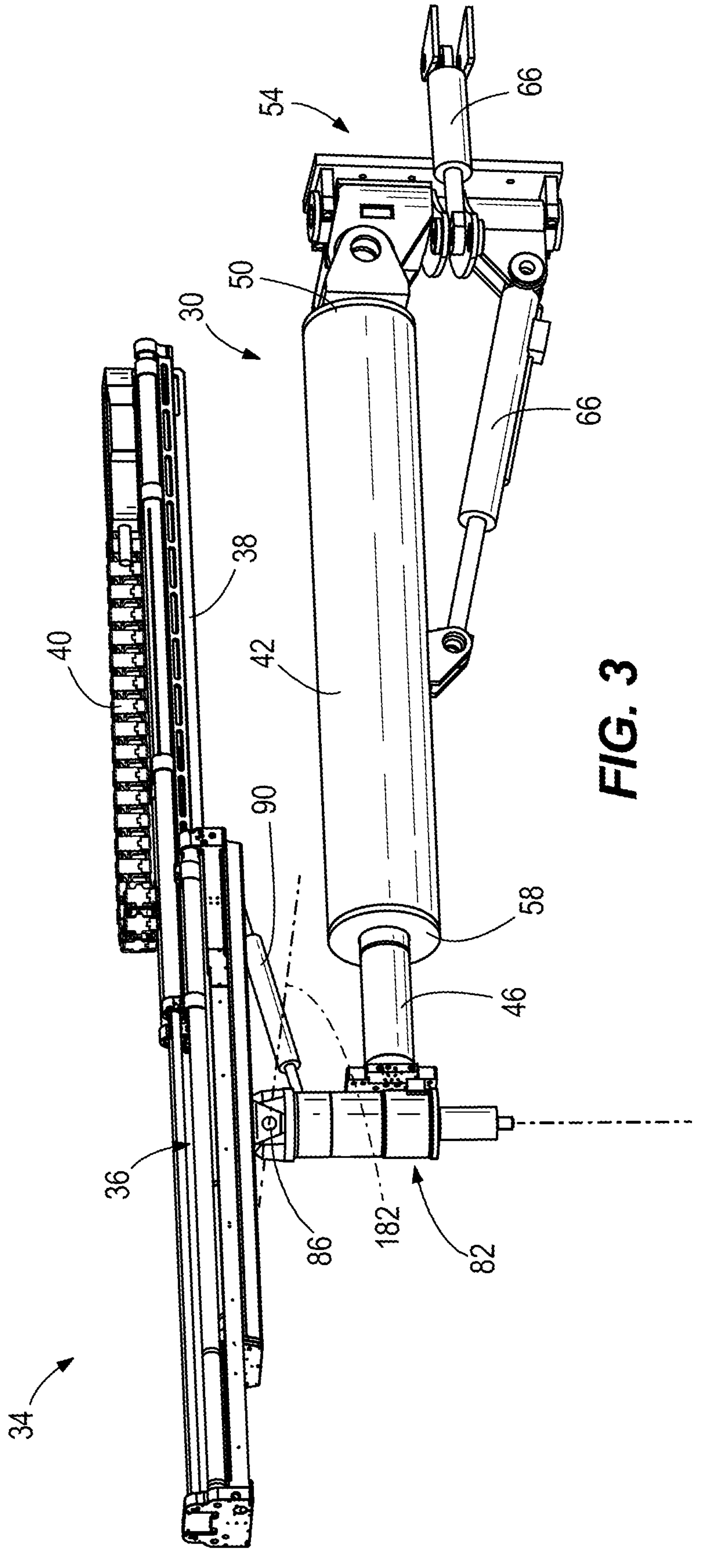
FIG. 3 is a perspective view of a drilling and bolting tool and a boom supporting the drilling and bolting tool.

As shown in FIG. 3, in the illustrated embodiment, the drill tool 34 includes a base frame 36, a feed frame 38 supported for telescoping movement relative to the base frame 36, and a rotation unit 40 for rotating a bit or a bolt. The rotation unit 40 is movable along the feed frame 38 and the base frame 36 to drive the bit or bolt into a rock surface. In some embodiments, the drill tool 34 may be similar to the drilling and bolting tool described in U.S. patent application Ser. No. 15/642,839, filed Jul. 6, 2017, the entire contents of which are hereby incorporated by reference.

Figure 4:
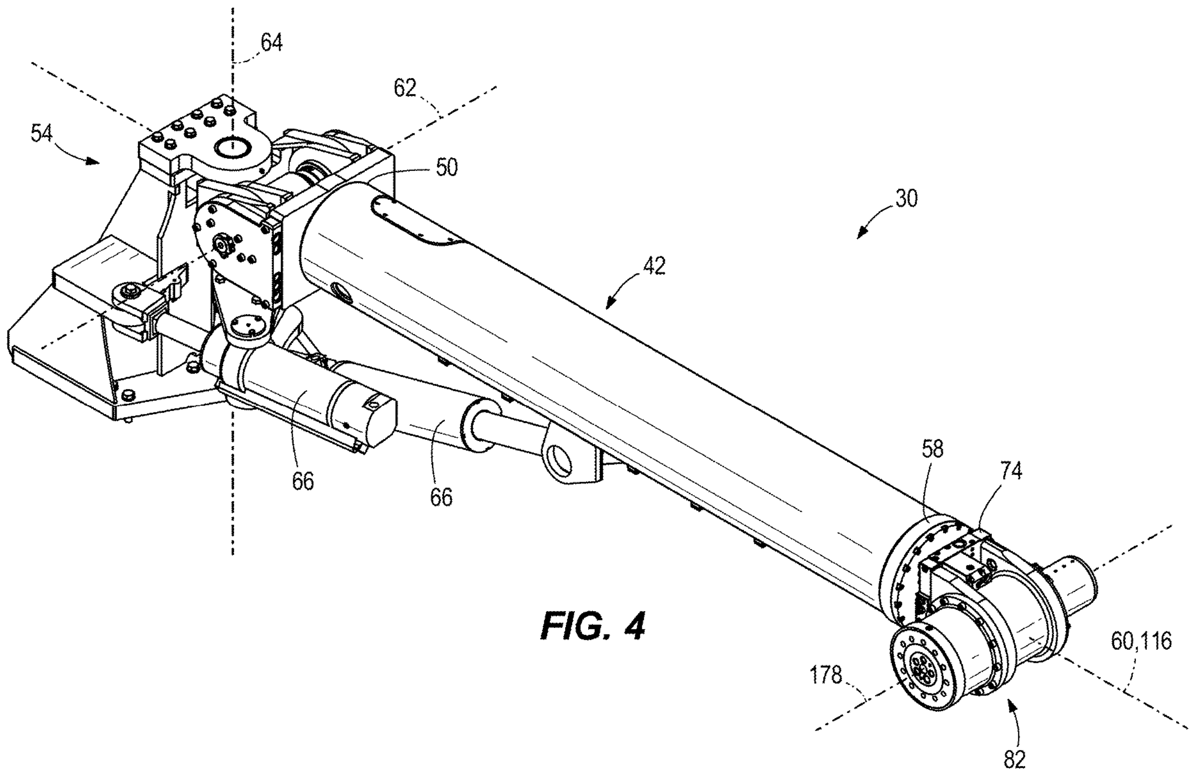
FIG. 4 is perspective view of the boom of FIG. 3.

FIGS. 3 and 4 illustrate a boom 30 according to one embodiment. The boom 30 includes an elongated housing 42 and a shaft 46 (FIG. 3) supported for translational movement relative to the housing 42. The housing 42 includes a first end 50 coupled to the chassis 18 and a second end 58 opposite the first end 50. A housing axis 60 extends between the first end 50 and the second end 58. In the illustrated embodiment, the second end 58 includes a bearing 56 (FIG. 6B) to support the shaft 46 for translational movement relative to the housing 42. The first end 50 can be supported on a bracket or carrier 54 to permit pivoting about multiple axes (e.g., a first axis 62 and a second axis 64—FIG. 4), and the housing 42 can be driven by actuators 66 (e.g., fluid cylinders) to pivot about the axes 62, 64.

Figure 5:
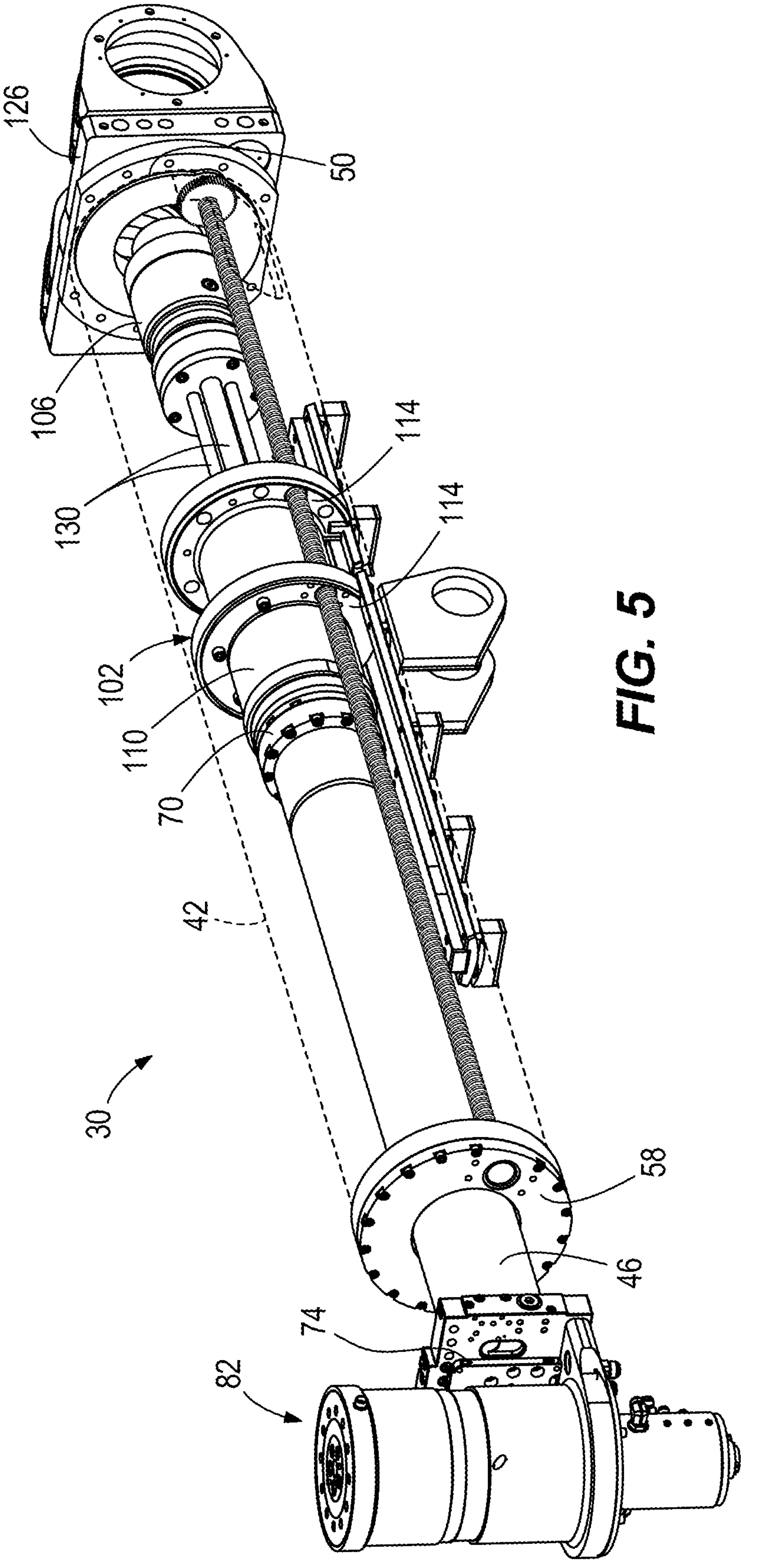
FIG. 5 is a perspective view of the boom of FIG. 3 with a support bracket removed.

Referring to FIG. 5, in the illustrated embodiment, the housing 42 has a hollow cylindrical shape, and the shaft 46 is movable to extend and retract relative to the housing 42 in a telescoping manner. A proximal end 70 of the shaft 46 is supported within the housing 42, while a distal end 74 is positioned beyond the second end 58 of the housing 42. The distal end 74 is coupled to and supports a combined actuator and flow distributor 82, which in turn is coupled to and supports the drill tool 34 (FIG. 3). In the illustrated embodiment, the drill tool 34 is coupled to the combined actuator and flow distributor 82 by a pin joint 86 (FIG. 3), and an actuator 90 pivots the drill tool 34 about an end of the combined actuator and flow distributor 82.

Figure 6A:
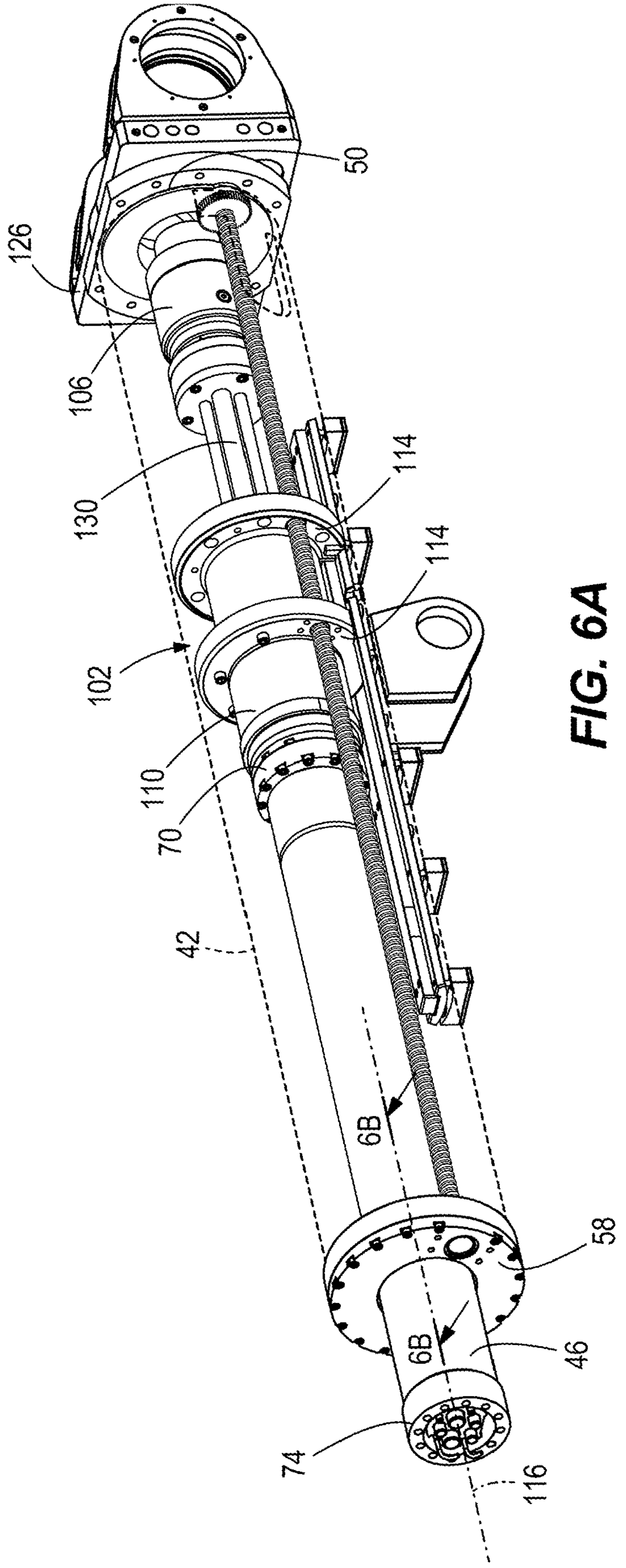
FIG. 6A is a perspective view of the boom of FIG. 5 with a combined actuator and flow distributor removed.
Figure 6B:
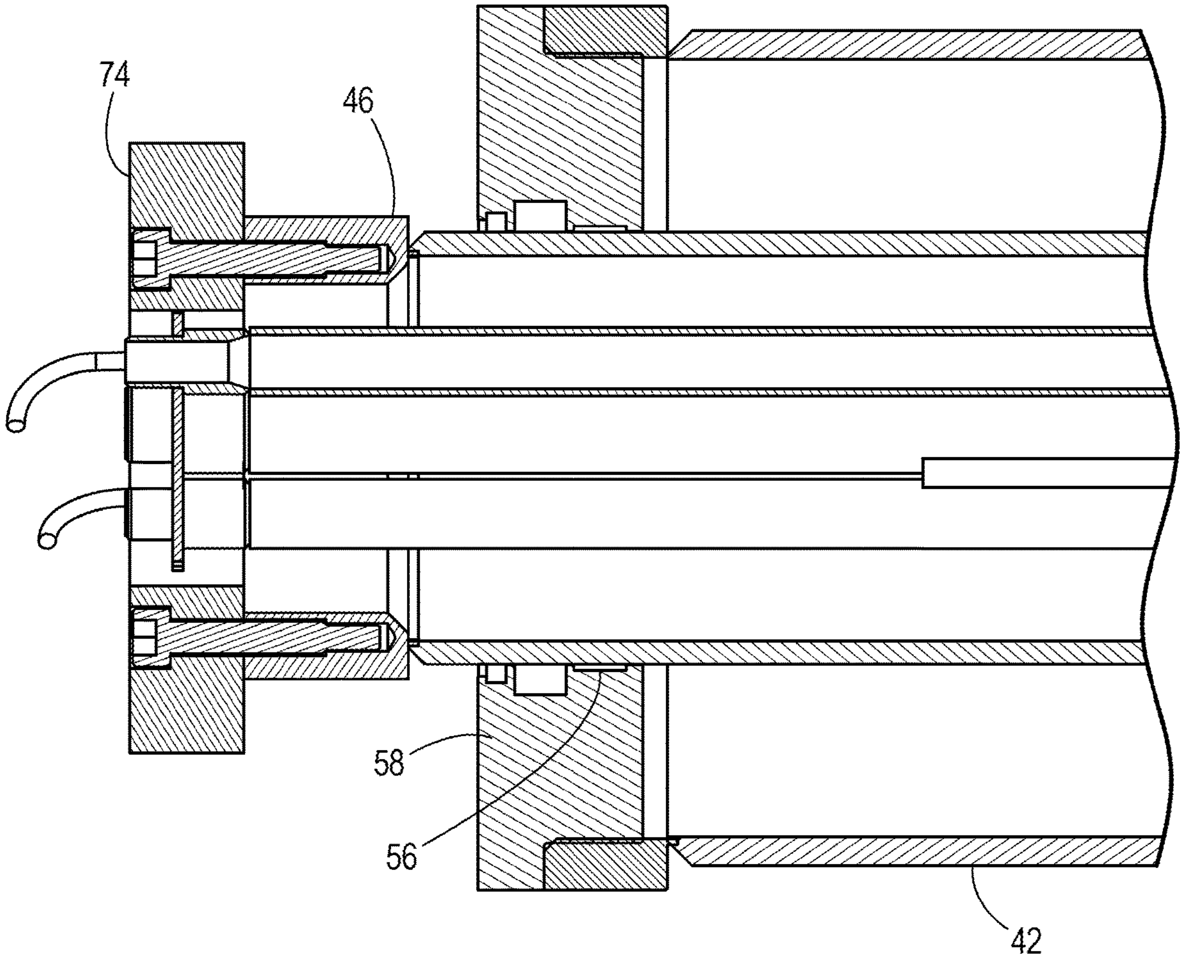
FIG. 6B is a section view of the boom of FIG. 6A, viewed along section 6B-6B.

As shown in FIGS. 5 and 6A, the boom 30 further includes an intermediate rotary actuator or shaft support 102 and a rotary flow distributor 106. In the illustrated embodiment, the shaft support 102 and the flow distributor 106 are positioned within the housing 42. The shaft support 102 includes a body 110 and a bearing 114 engaging an inner surface of the housing 42. The bearing 114 of the shaft support 102 and the bearing 56 (FIG. 6B) proximate the second end 58 maintain the shaft 46 in a desired radial position relative to the housing 42.

Figure 9:
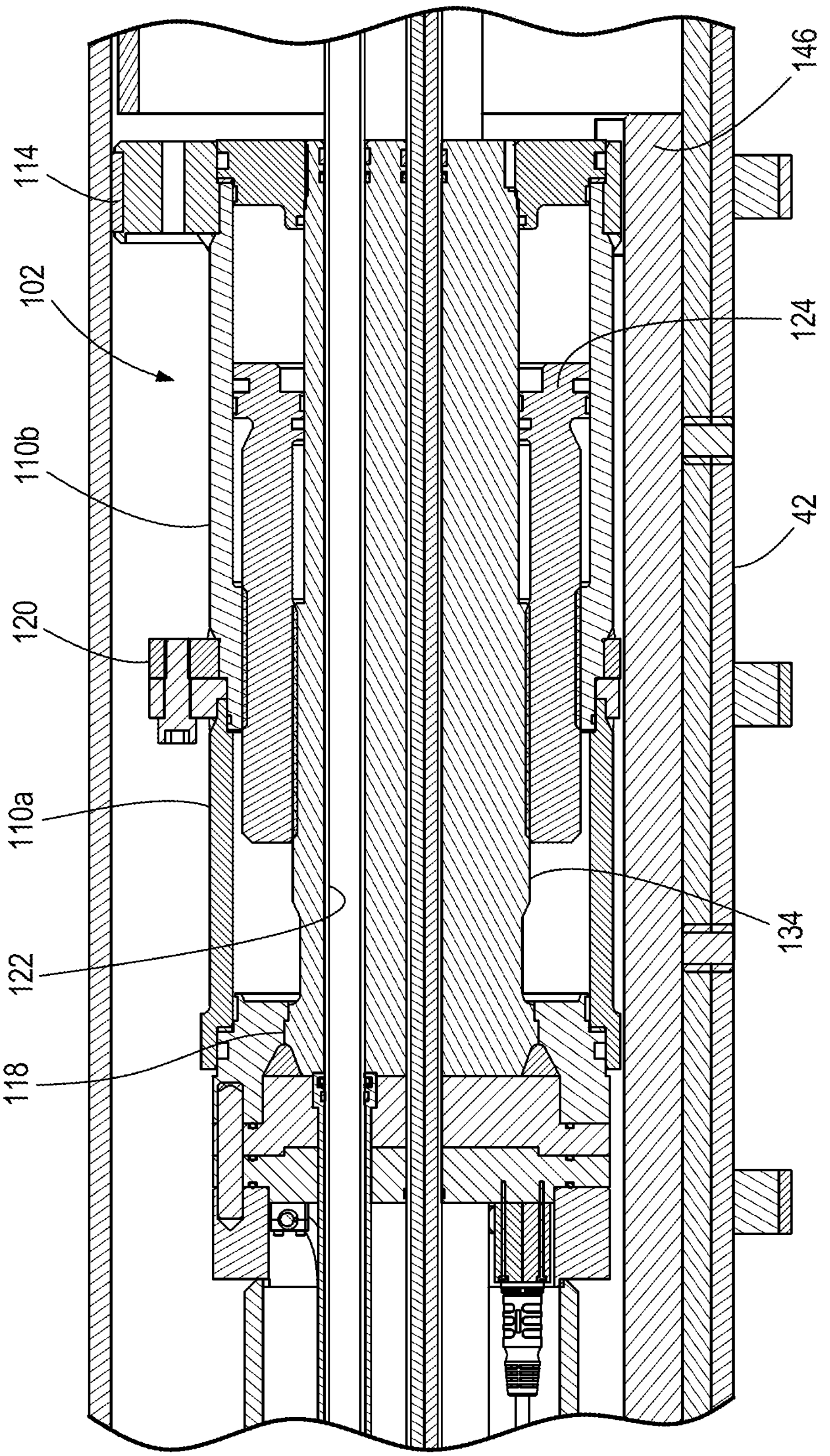
FIG. 9 is a section view of the boom of FIG. 8, viewed along section 9-9.
Figure 10:
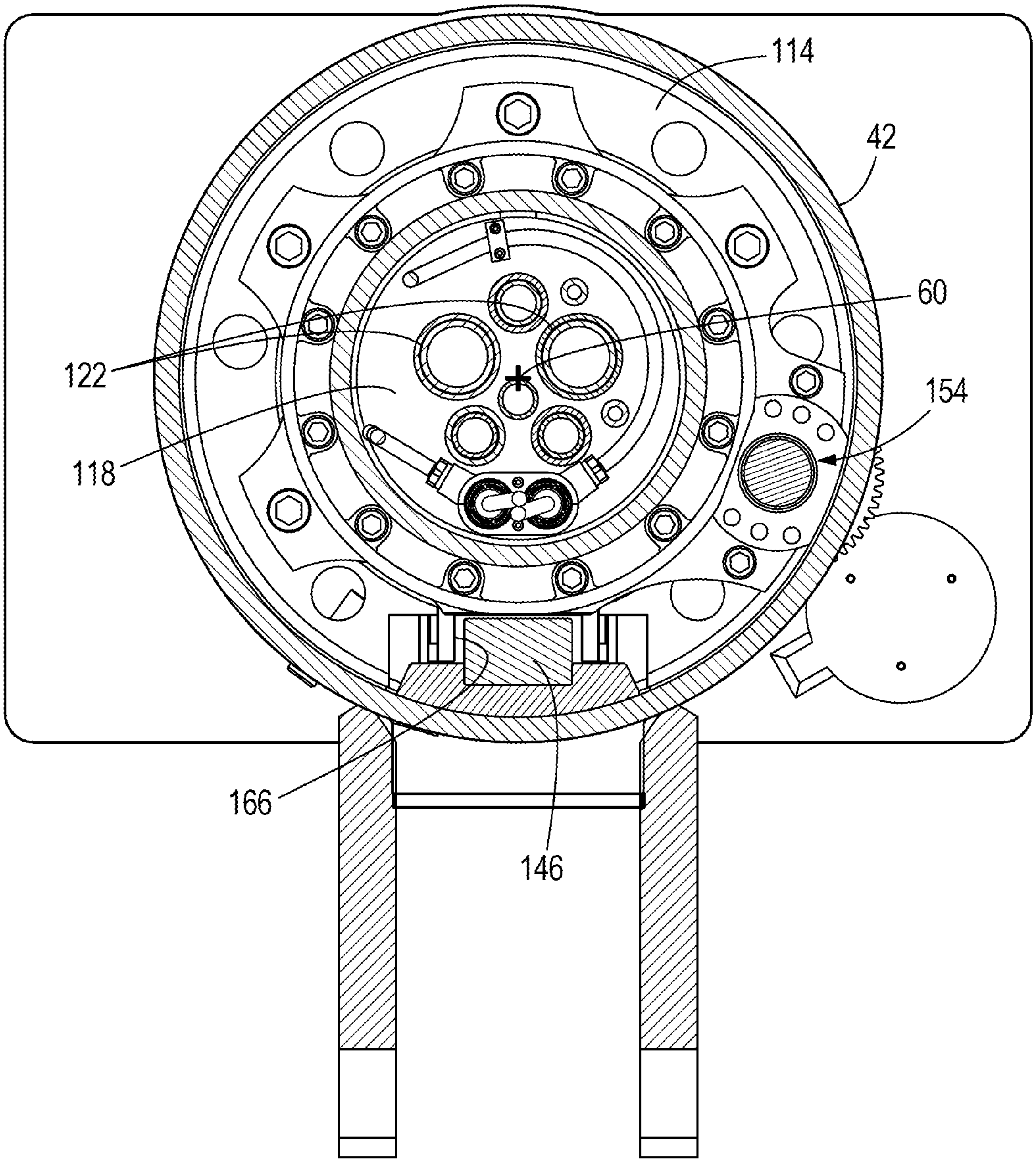
FIG. 10 is a section view of the boom of FIG. 8, viewed along section 10-10.
Figure 11:
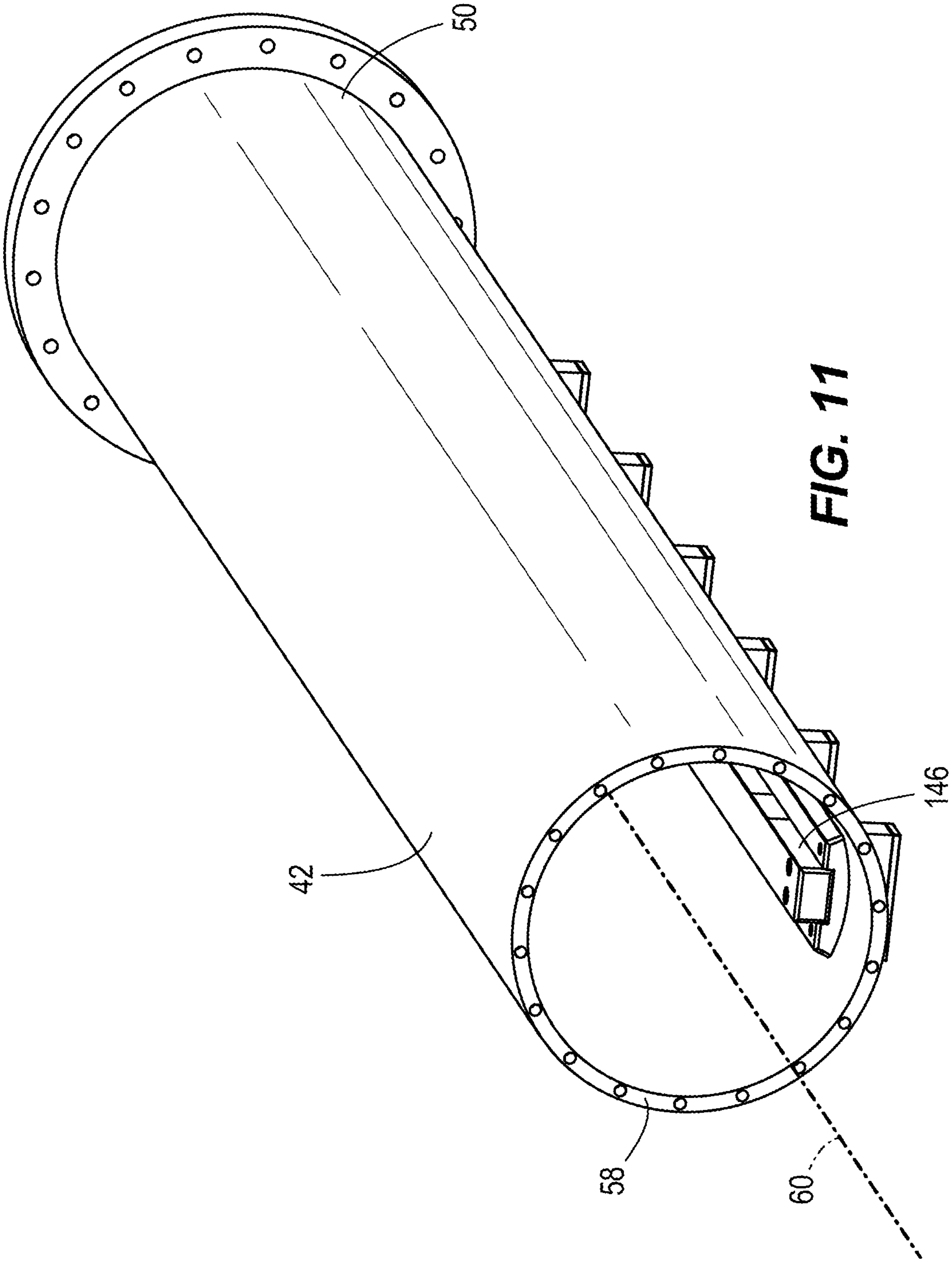
FIG. 11 is a perspective view of a boom housing.
Figure 12:
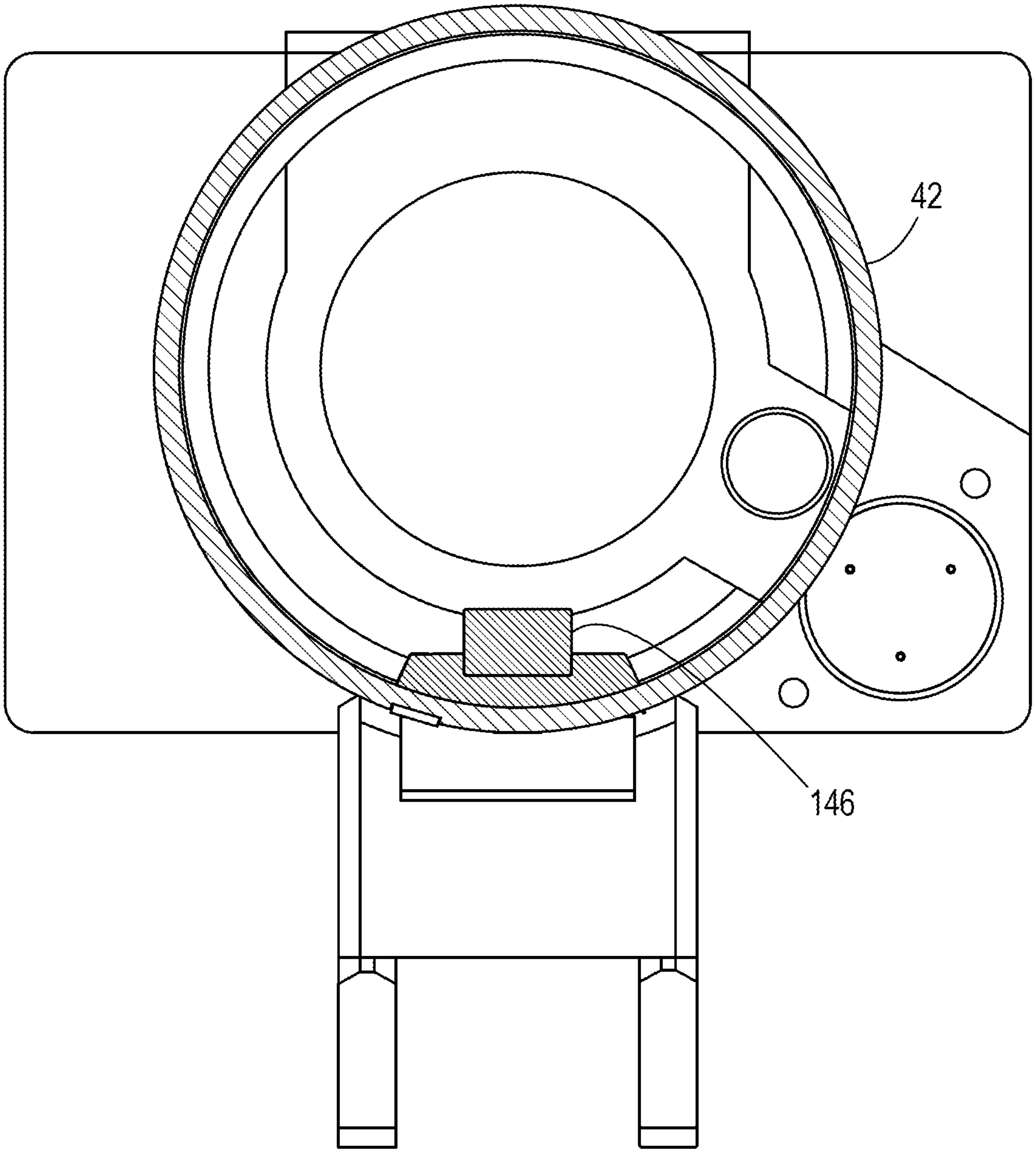
FIG. 12 is an end view of the boom housing of FIG. 11.

As shown in FIG. 9, in the illustrated embodiment, the body 110 includes portions 110*a*, 110*b* coupled together by a flange 120. Also, an inner portion 134 (FIG. 9) of the shaft support 102 is coupled to the proximal end 70 of the shaft 46 and is rotatable relative to the body 110 about a longitudinal axis 116 of the shaft 46 (FIG. 5). The longitudinal axis 116 of the shaft 46 can be aligned with the housing axis 60 (FIG. 4) in some embodiments. In other embodiments, the axes of the shaft 46 and the housing 42 may not be aligned; for example, as shown in FIG. 7B, the axis 116' of the shaft 46' and the rotary actuator/shaft support 102' may be parallel to but offset from the housing axis 60'. As shown in FIG. 10, the shaft support 102 also includes a conduit guide 118. In the illustrated embodiment, the conduit guide 118 is formed as a plate including holes 122.

A piston 124 is coupled to an outer surface of the inner portion 134. The piston 124 is slidable relative to the inner portion 134. In the illustrated embodiment, the piston 124 engages a helical spline on the outer surface of the inner portion 134. When the piston 124 is actuated (e.g., by pressurized fluid) to move or translate toward one end of the shaft support 102, the piston 124 moves relative to the inner portion 134 and the helical spline engagement between the piston 124 and the inner portion 134 causes the inner portion 134 and the shaft 46 (FIG. 5) to rotate about its longitudinal axis. As a result, the piston 124 permits a user to adjust the rotational position of the shaft 46.

Referring again to FIGS. 5 and 6A, the flow distributor 106 is positioned adjacent the first end 50 of the housing 42. In some embodiments, the first end 50 of the housing and the flow distributor 106 are coupled to a flange 126 secured to the bracket or carrier 54 (FIG. 3). The flow distributor 106 is in fluid communication with a fluid source (e.g., a pump—not shown). Trombones or tubes 130 support fluid conduits (e.g., hoses) providing fluid communication between the flow distributor 106 and the inner portion 134 of the shaft support 102. Fluid passages extend through the shaft support 102 and are in communication with conduit (e.g., hoses or tubes) extending through the shaft 46 to the combined actuator and flow distributor 82 (FIG. 5). In addition, the tubes 130 may support electrical wires providing electrical power and/or communication to components on the drill tool 34. A slip ring (not shown) can maintain electrical communication between the rotating components and the fixed portion of the boom 30. In the illustrated embodiment, each conduit or wire passes through an associated one of the holes 122 in the conduit guide 118 (FIG. 10). As the shaft 46 rotates relative to the housing 42, the conduit guide 118 rotates the tubes 130 supporting the conduits and wires. The flow distributor 106, tubes 130, and slip ring provide communication between the stationary structures and the movable components, permitting electrical and fluid communication therebetween.

Figure 7A:
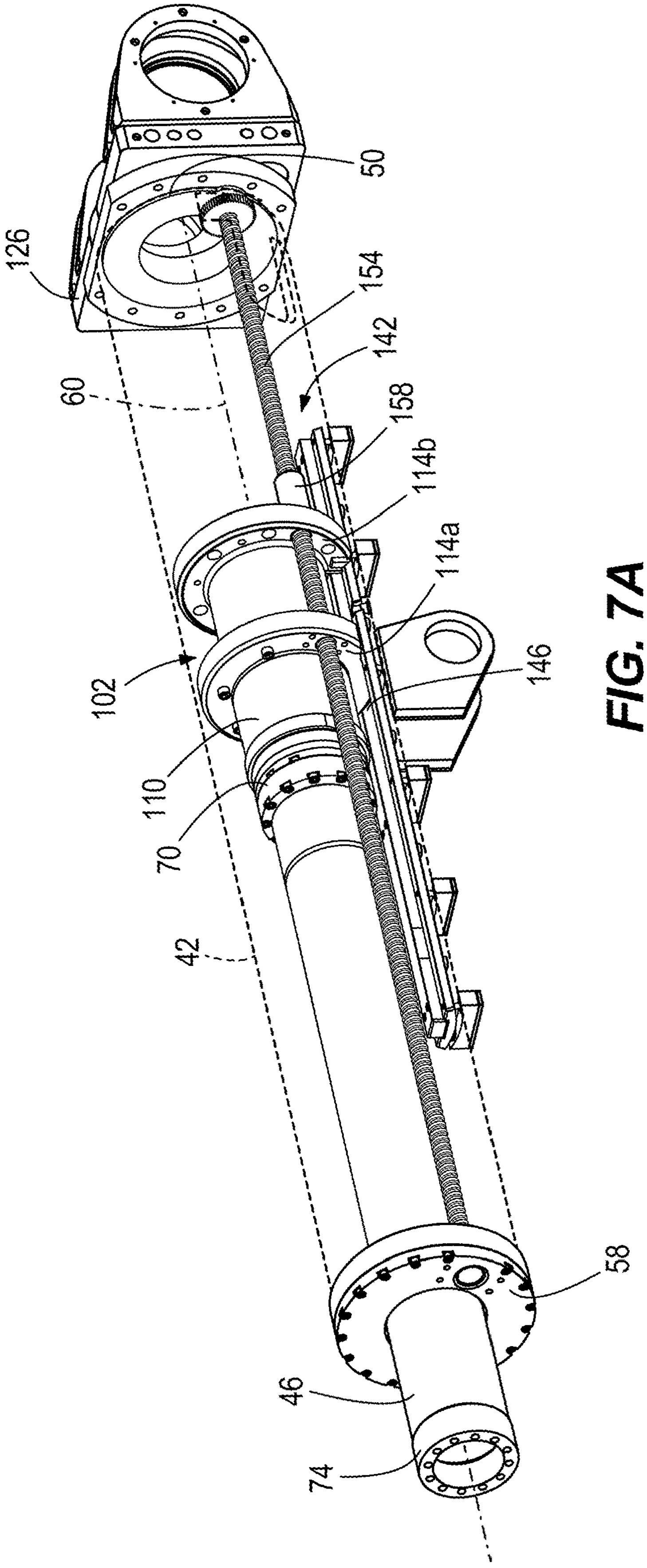
FIG. 7A is a perspective view of the boom of FIG. 6A with a flow distributor removed.
Figure 7B:
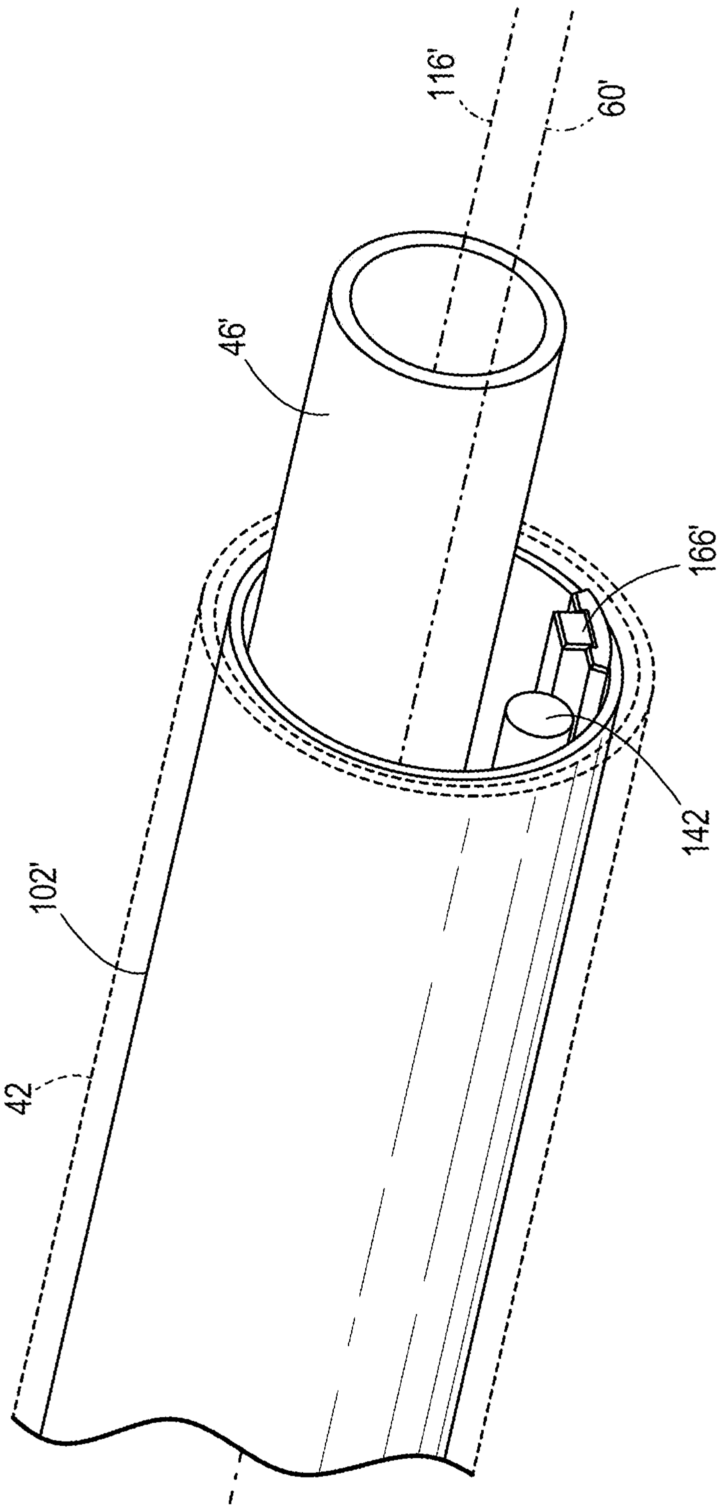
FIG. 7B is a perspective view of a boom according to another embodiment.
Figure 8:
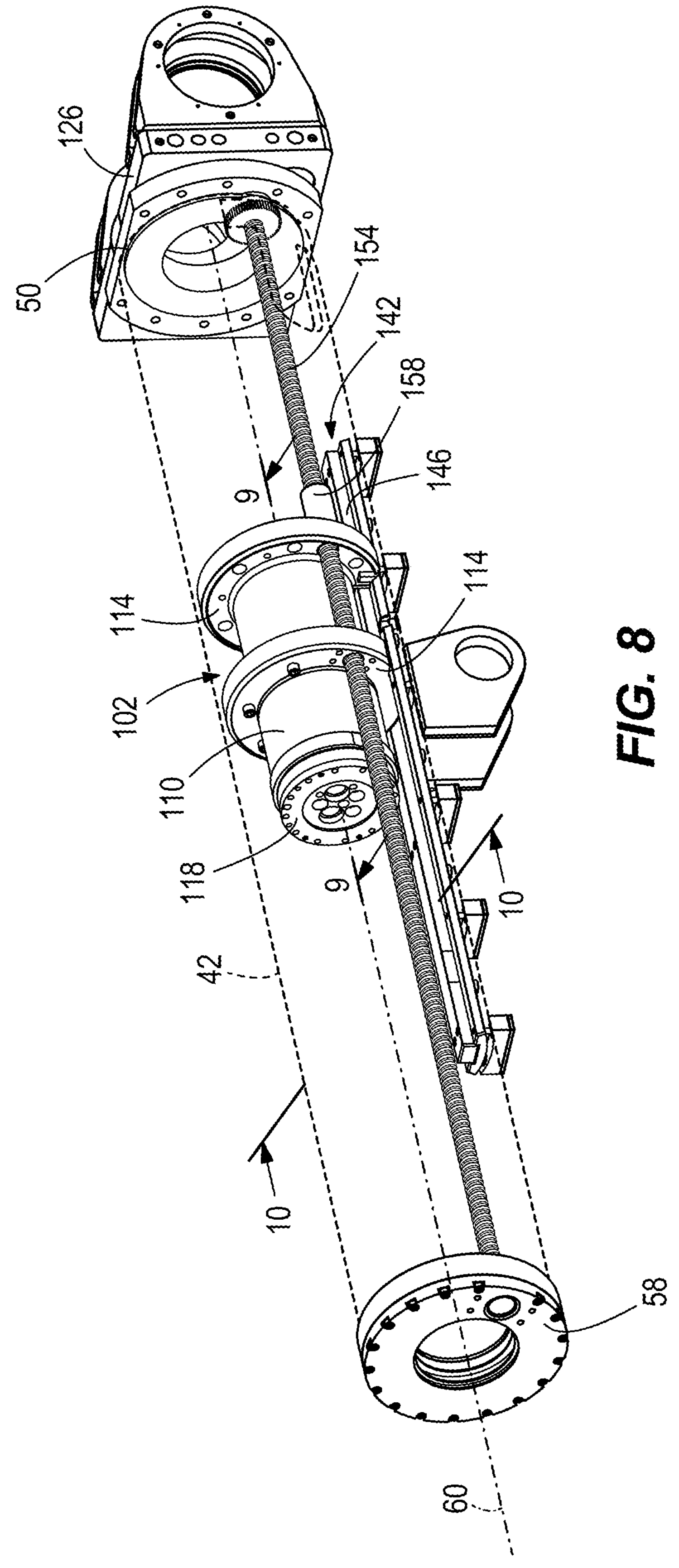
FIG. 8 is a perspective view of the boom of FIG. 6A with a shaft removed.

Referring now to FIGS. 7A and 8, the shaft 46 is extended and retracted relative to the housing 42 by a linear actuator 142. The linear actuator 142 includes a track or guide 146 secured to an inner surface of the housing 42 and extending between the first end 50 and the second end 58. In addition, the linear actuator 142 includes a drive mechanism. In the illustrated embodiment, the drive mechanism is a ball screw including a threaded shaft 154 extending between the first end 50 and the second end 58 of the housing 42. A threaded coupler 158 is secured to the shaft support 102 and threadably engages the threaded shaft 154. Rotation of the threaded shaft 154 (or alternatively, rotation of the threaded portion of the coupler 158) causes the coupler 158 to move along the threaded shaft 154 at least partially between the first end 50 and the second end 58 of the housing 42, thereby also moving the shaft support 102 and shaft 46 (FIG. 7A) relative to the housing 42 parallel to the housing axis 60. In some embodiments, the threaded shaft 154 may be driven to rotate by an electric motor (e.g., a switched reluctance (SR) motor, an alternating current (AC) motor, or a permanent magnet motor—not shown). In other embodiments, the motor is a hydraulic motor. In still other embodiments, the drive mechanism may include another type of actuator such as a fluid cylinder.

The shaft support 102 includes a keyway or slot 166 (FIG. 10) for engaging the guide 146 and maintaining the shaft 46 in a desired rotational position (that is, the engagement of the slot 166 and the guide 146 secures the shaft 46 against movement relative to the housing 42 about the housing axis 60). As the shaft support 102 moves within the housing 42 along the guide 146, the bearing 114 engages (e.g., slide or roll along) the inner surface of the housing 42 to maintain the shaft 46 in a desired radial position and alignment relative to the housing 42. In the illustrated embodiment, the shaft 46 has a hollow cylindrical shape and transmits radial, bending, and torsional loads to the housing 42 through the bearing 114 of the shaft support 102 and the bearing 56 at the second end 58 of the housing 42. In addition, the shaft support 102 and the flow distributor 106 (FIG. 6A) are positioned within the housing 42, positioning the weight of the boom 30 closer to the chassis 18 of the machine 10 and increasing overall stability. In addition, a user can control the bending moment exerted on the shaft 46 by controlling the distance between the bearings 56, 114 supporting the shaft. For example, in order to reduce the overhanging load (i.e., the portion of the shaft 46 that is supported in a cantilevered condition), the distal end 74 of the shaft 46 can be moved closer to the bearing 56.

In addition, the conduits and wires pass through the shaft support 102 and the shaft 46 and are in communication with the combined rotary actuator and flow distributor 82 at the distal end 74 of the shaft 46. Stated another way, the bearing 114, the linear actuator 142, and the tubes 130 supporting the conduits and wires are positioned within the housing 42, thereby sealing these components from contamination and protecting them from the surrounding environment. Among other things, the boom 30 does not require external hoses, tubes, cables, or wires, which can get caught or bind (e.g., due to over-rotation) and constrain movement of the boom 30. Also, the bearing 114 and linear actuator 142 are enclosed within the housing 42 and can be positively lubricated, thereby reducing wear on sliding parts.

Referring again to FIG. 4, the shaft 46 may be driven to rotate (e.g., by a motor—not shown) about its longitudinal axis 116 (or about the housing axis 60). In addition, the combined actuator and flow distributor 82 coupled to the distal end 74 of the shaft 46 defines a second axis of rotation 178 that is substantially orthogonal to the longitudinal axis 116 of the shaft 46. The combined actuator and flow distributor 82 supports the drill tool 34 for rotation about the second axis of rotation 178. For example, in some embodiments, the combined actuator and flow distributor 82 includes a fluid motor for rotating a joint 86 (FIG. 3) to which the drill tool 34 is coupled. In addition, the drill tool 34 can be pivoted by an actuator 90 about a third axis 182 oriented substantially orthogonal to the second axis 178. The boom 30 thus provides multiple degrees of freedom to permit the drill tool 34 to be positioned in a wide range of orientations.

Figure 13:
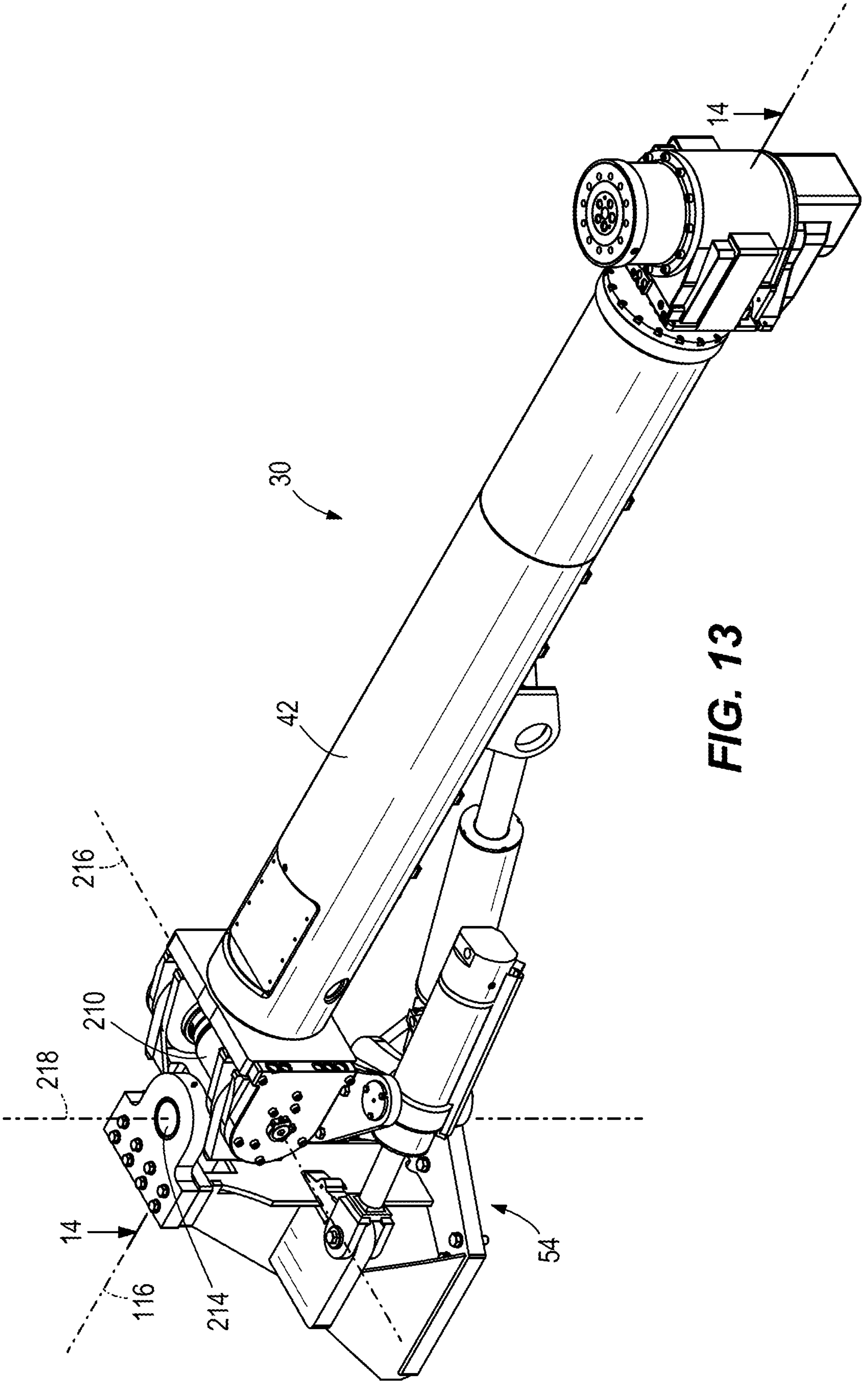
FIG. 13 is another perspective view of a boom.
Figure 14:
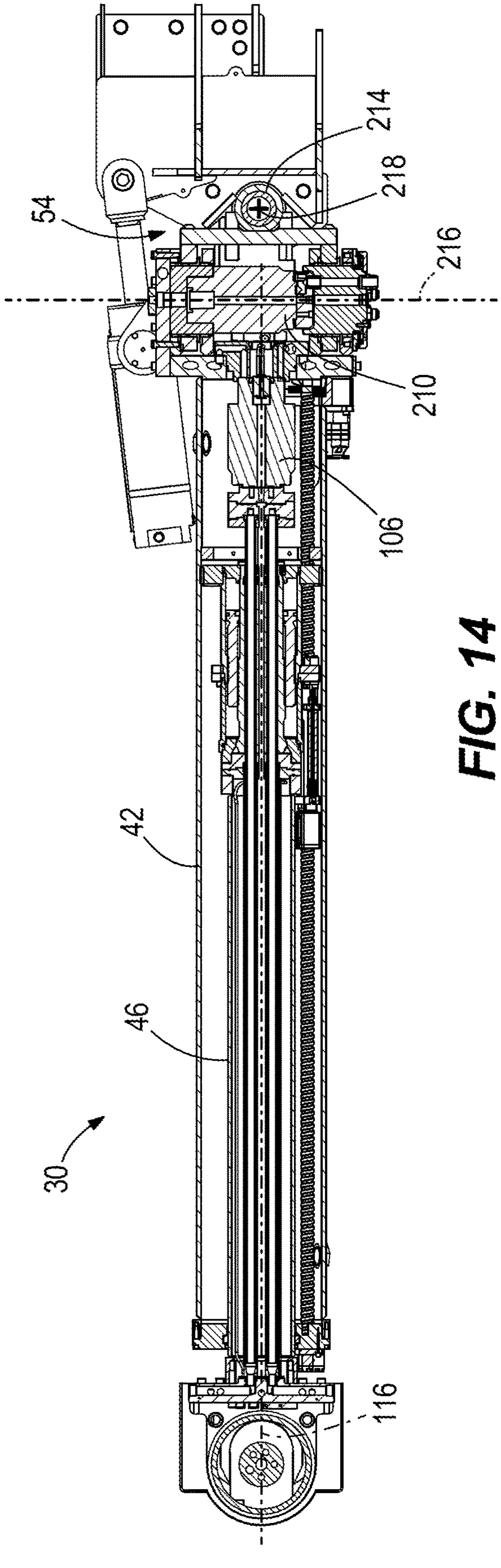
FIG. 14 is a section view of the boom, as viewed along section 14-14 of FIG. 13.

Furthermore, as shown in FIGS. 13 and 14, in some embodiments, the boom 30 includes multiple rotary flow distributors or rotary unions. For example, as shown in FIG. 14, in addition to the rotary flow distributor 106 that transmits fluid as the shaft 46 rotates relative to the housing 42 (e.g., about the longitudinal axis 116), rotary flow distributors 210, 214 can also be positioned proximate the pivot connections between the boom 30 and the carrier 54. For example, a second rotary fluid union 210 may be oriented to transmit fluid while the boom 30 is articulated about a second axis 216 (e.g., in a vertical or up-and-down direction), and a third rotary fluid union 214 may be oriented to transmit fluid while the boom 30 is articulated about a third axis 218 (e.g., in a horizontal or side-to-side direction). The rotary flow distributors 210, 214 facilitate the positioning of fluid transmission passages within internal structure, protecting the fluid lines and further reducing the need for hoses.

In some embodiments, the boom actuators and the linear actuator 142 are operated by distributed logic and controller area network (CAN) communications. The compact size and weight of the boom 30 permits it to be attached to a machine 10 configured to work in narrow or restrictive tunnels. The boom 30 could be scaled up to permit additional and/or larger fluid and electric lines.

Conventional machines may include one or more pumps dedicated to specific functions (e.g., a percussion or impact function that requires large power input) to permit one or more separate motors and pumps to concurrently operate other functions (e.g., at a lower power input). In contrast, the boom 30 and drill tool 34 of the illustrated embodiment can be operated by distributed hydraulic control. Among other things, the boom 30 may be operated by a single pump, rather than multiple pumps that are dedicated to certain operations of the boom 30 and drill tool 34. As a result, the boom 30 requires a single supply port, permitting the size and weight of the boom 30 to be reduced and increasing the stability and efficiency of the machine 10. In some embodiments, the single pump system may include a pressure compensated valve for the rotation function to isolate the rotation operating pressure to achieve a similar effect to systems that incorporate a secondary pump dedicated to providing the rotation function.

Figure 15:
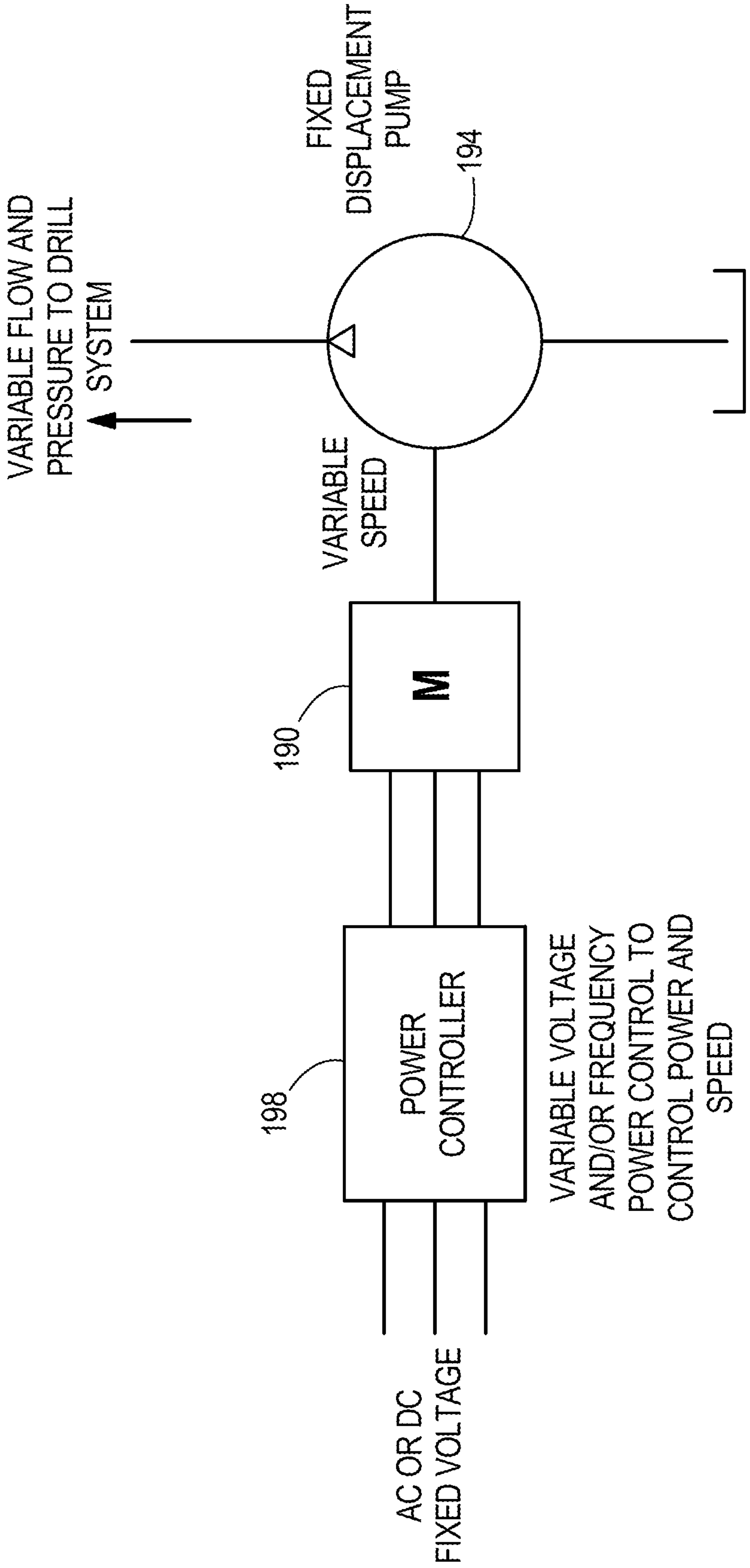
FIG. 15 is a schematic of a hydraulic system.

Referring to FIG. 15, in some embodiments, the boom 30 includes one or more variable speed electric motors 190 driving a fixed displacement pump 194 (e.g., bent axis pump, radial piston pump, etc.). The system avoids the need for downstream control valves, instead controlling flow through an onboard controller 198 that receives an input to adjust the motor speed. The input can provide a comparable function to the operation of valve spool on a conventional drill jumbo. The removal of the downstream valves removes sources of pressure loss and heat generation, and the removal of the pump switching and valve control mechanisms removes sources of delay in the system to improve responsiveness. One result is greater efficiency, and the power supply may provide less power in a given period of time. For systems including a battery power source, the battery can supply power for a longer period of time between charges.

The hydraulic system permits the machine 10 and the drill tool 34 to operate more efficiently than conventional drill jumbos, reducing losses caused by, among other things, heat and noise. The machine 10 and can operate more safely and at a lower required power input (and therefore at a lower cost) than conventional drill jumbos. In addition, the system avoids the need for relatively complex variable displacement pumps, which can be susceptible to premature failure (e.g., due to a lack of priming the internal hydraulic signal that brings the pump pressure on-line). Rather, including a fixed displacement pump powered by a variable motor improves system reliability and reduces cost.

Figure 16:
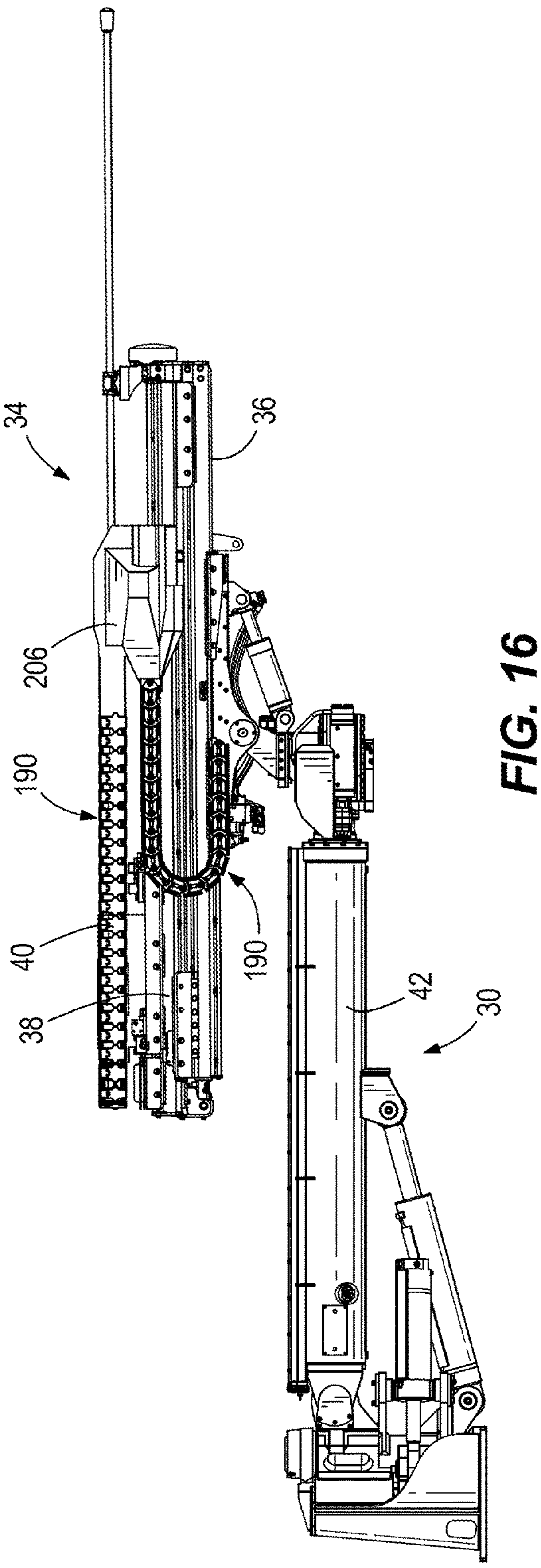
FIG. 16 is a side view of a boom supporting a drilling and bolting tool according to another embodiment.
Figure 17:
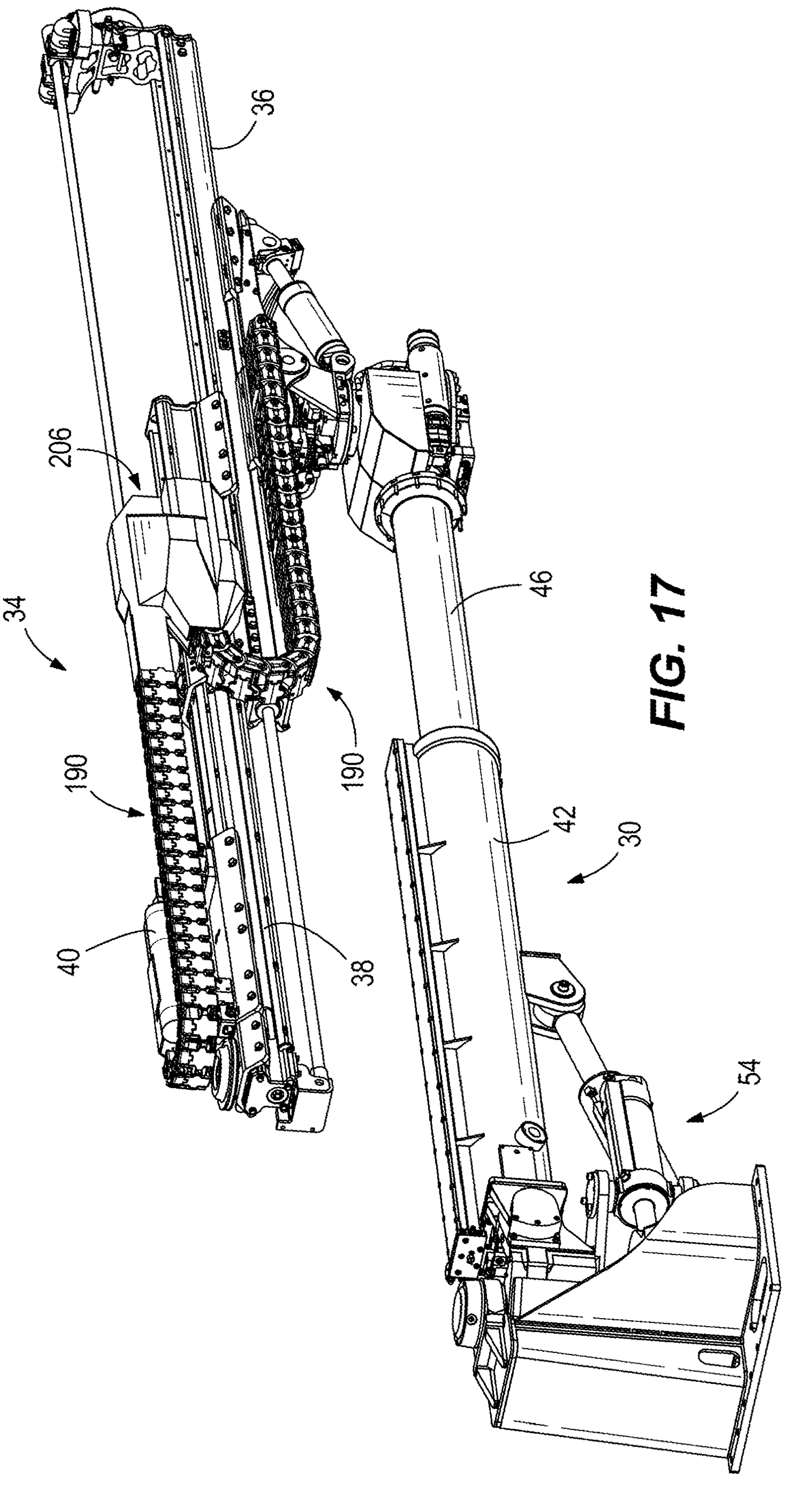
FIG. 17 is a perspective view of the boom and drilling and bolting tool of FIG. 16
Figure 18:
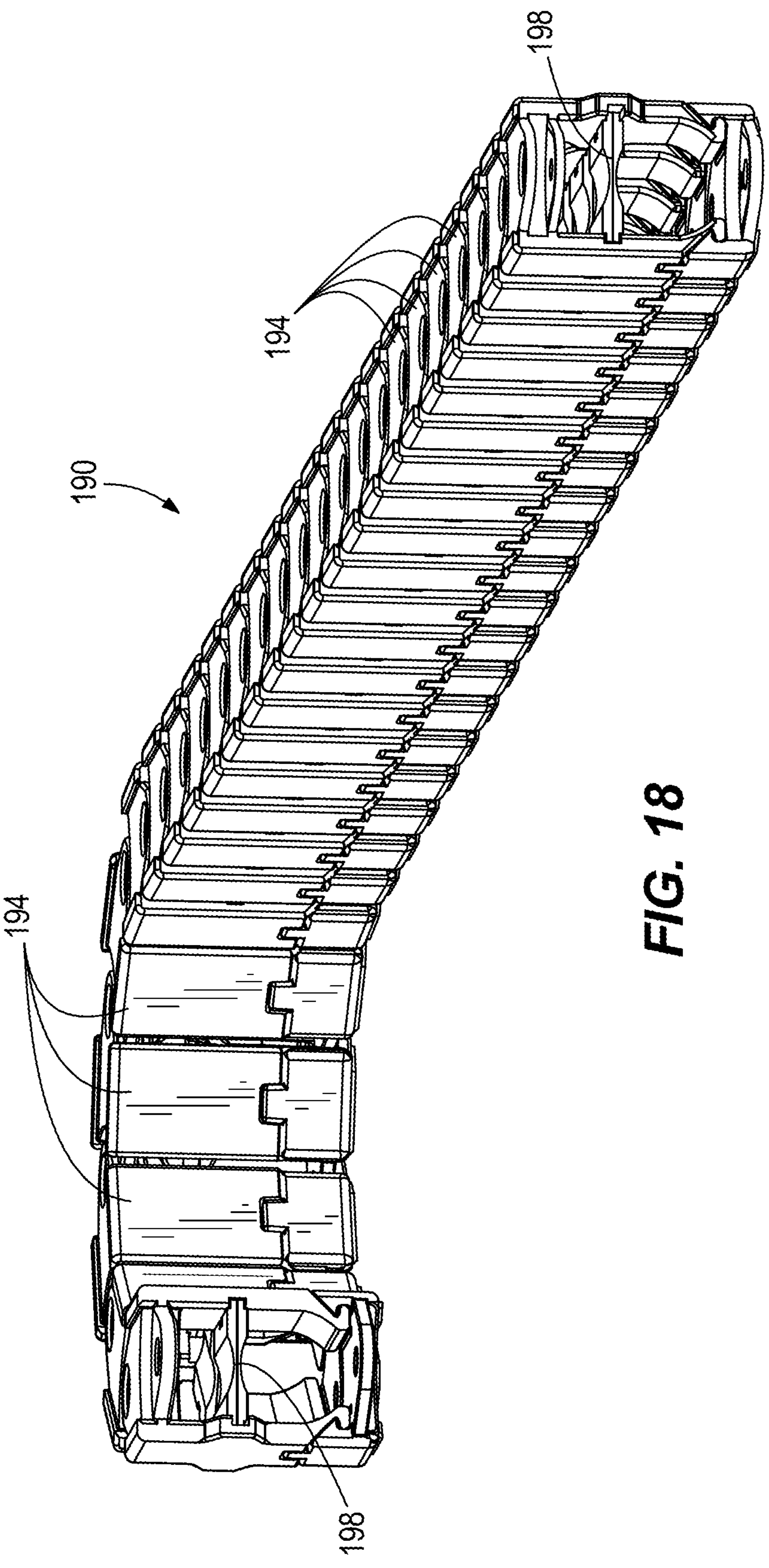
FIG. 18 is a perspective view of an energy chain.

In some embodiments, the drill tool 34 is driven by pressurized fluid (e.g., hydraulic fluid), and fluid supply conduits or lines (not shown) are coupled between the boom 30 and the drill tool 34 to supply fluid to the drill tool 34. Referring to FIGS. 16 and 17, the fluid supply connector lines (not shown) can be housed within an energy chain 190. In the illustrated embodiment, an energy chain 190 can also supply fluid to the rotation unit 40 from the valve block 206. As shown in FIG. 18, the energy chain 190 includes a plurality of interconnected hollow links 194 forming a passageway through which the supply connector lines pass. One or more partitions 198 are positioned within the passageway to segregate different types of supply lines. For example, a conduit providing fluid to operate a percussion actuator can be separated from other conduits, because the frequent pulses of high pressure in the percussion power conduit cause vibrations that can accelerate wear if the conduit were in contact with other conduits/hoses. The provision of the energy chain 190 reduces the need to maintain the supply conduits in tension (e.g., with a hose reel or drum) and reduces the possibility of snagging or entanglement of the hydraulic conduits.

In addition, as shown in FIG. 16, pressurized fluid may be supplied to a valve block or manifold 206 positioned directly on the drill tool 34 (e.g., on a feed frame 38 of the drill tool 34). The fluid supply conduits for controlling operation of the drill tool 34 are directly connected to the valve block 206, allowing the valve block 206 to be directly ported to the actuators (e.g., feed actuators) and further reducing the need for hoses.

Figure 19:
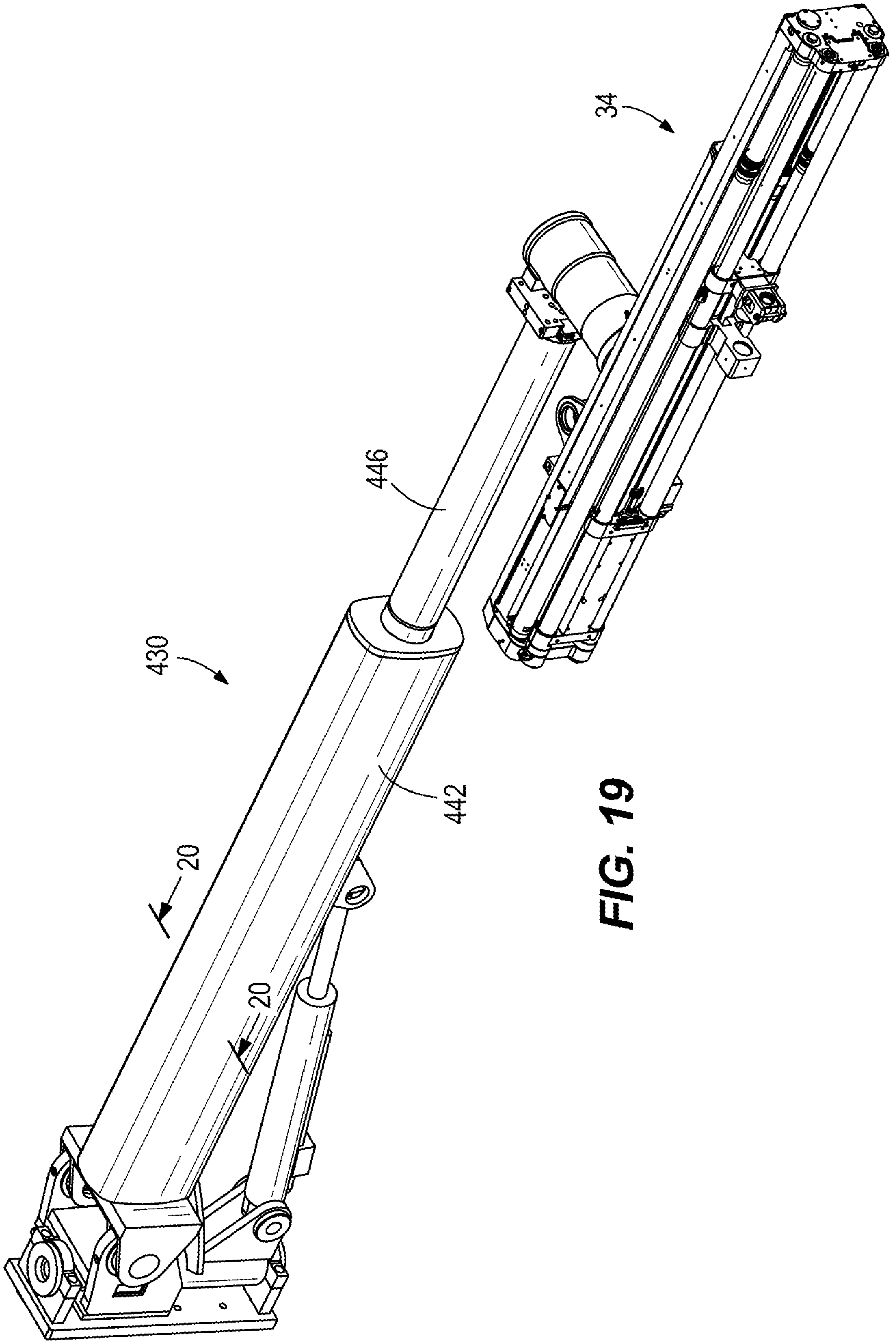
FIG. 19 is a perspective view of a boom according to another embodiment.
Figure 20:
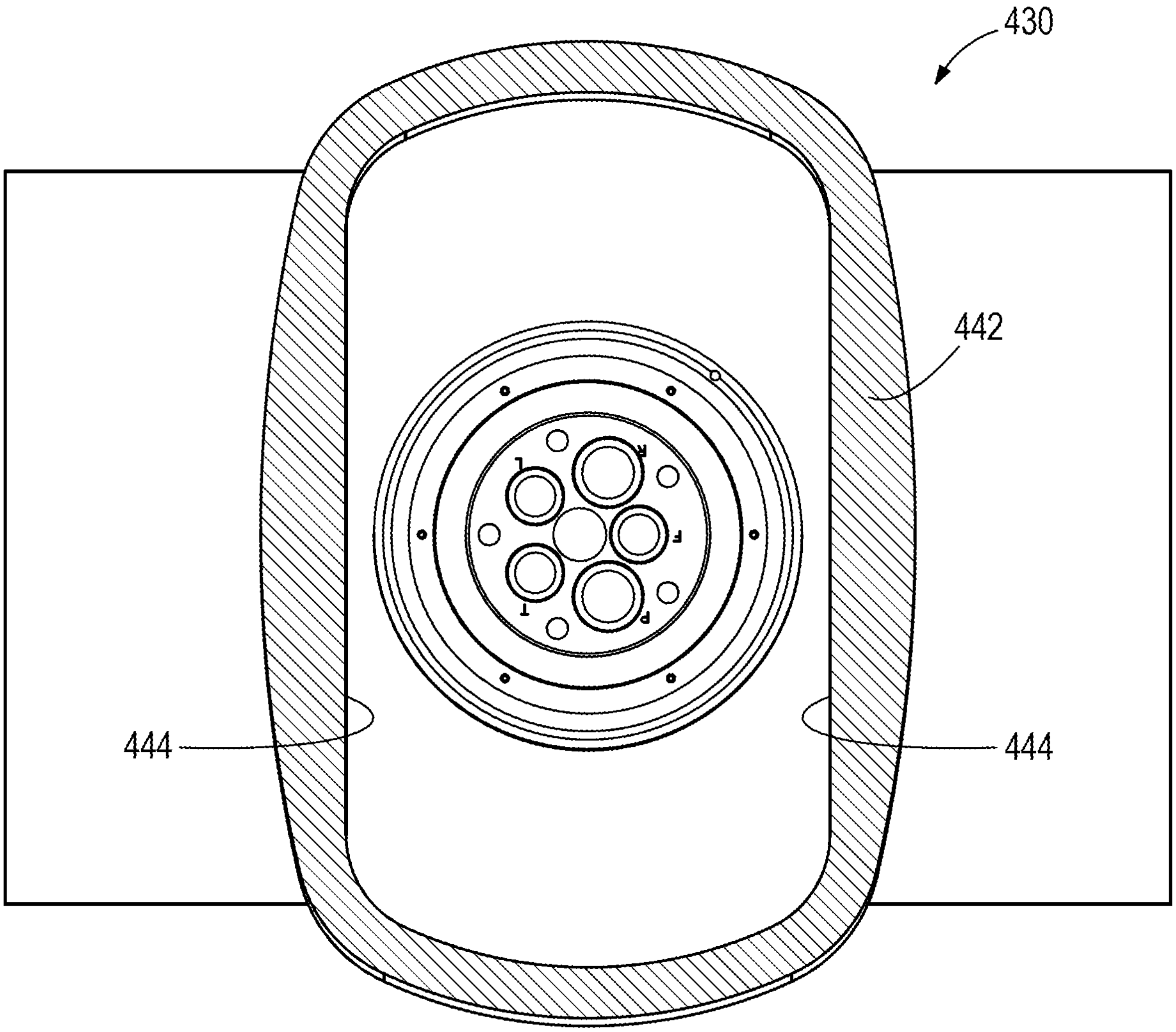
FIG. 20 is a section view of the boom of FIG. 19, viewed along section 20-20.
Figure 21:
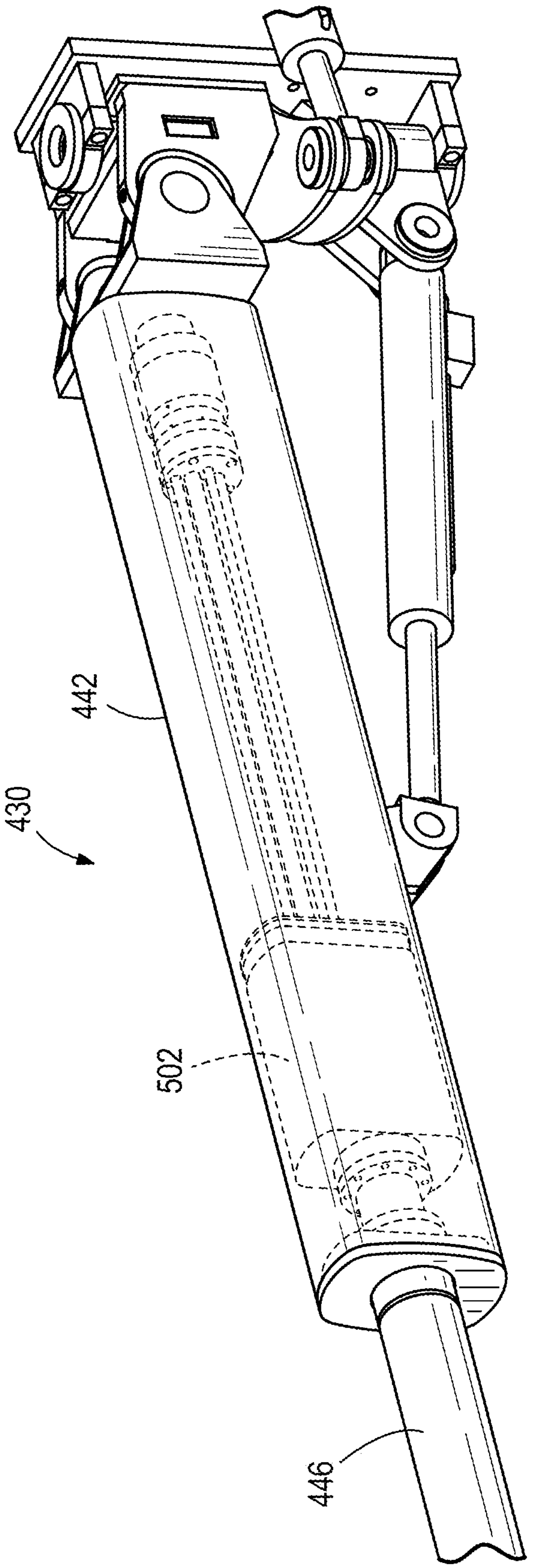
FIG. 21 is a perspective view of a portion of the boom of FIG. 19.

FIGS. 19-21 illustrates a boom 430 according to another embodiment. Features of the boom 430 that are similar to the boom 30 are identified with similar reference numbers, plus 400. For the sake of brevity, some differences of the boom 430 are described herein. For example, the boom 430 includes an elongated housing 442 having a non-circular cross-section. The elongated housing 442 may have an oval or elliptical cross-section. In other embodiments, the cross-section may be substantially circular, but one or more portions of the profile may have a flat wall. In the illustrated embodiment, the housing 442 is formed with a cross-section that is "stretched" or transversely elongated and includes a pair of substantially flat walls 444. A shaft support 502 (FIG. 21) may include profiled bearings that engage the inner surfaces of the housing 442 as the shaft 446 extends and retracts, thereby not requiring a track or guide as a separate component. In the illustrated embodiment, the shaft support 502 has a similar elongated cross-sectional profile to the housing 442. The flat walls 444 provide uniform torque-reaction surfaces that can be sealed against ingress of foreign materials, and also can be sealed to permit the inner portion of the boom 430 to be energized with pressurized fluid for extension and retraction. Alternatively, the boom 430 can be actuated via a linear ball screw device that is driven either by pressurized fluid or by an electric motor.

Figure 22:
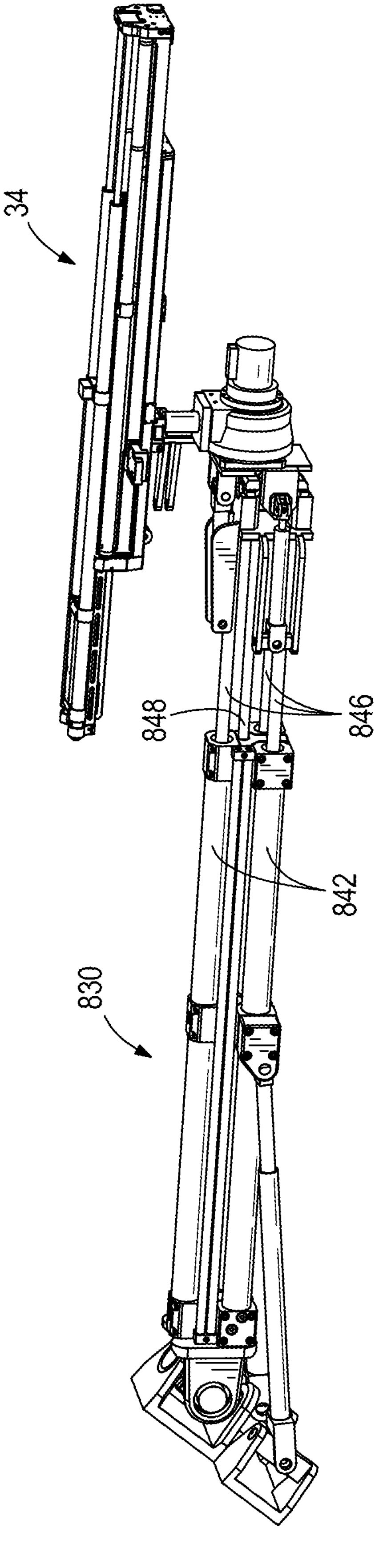
FIG. 22 is a perspective view of a boom and drilling and bolting tool according to another embodiment.

FIG. 22 illustrates a boom 830 according to another embodiment. Features of the boom 830 that are similar to the boom 30 are identified with similar reference numbers, plus 800. For the sake of brevity, some differences of the boom 830 are described herein. For example, the boom 830 includes a plurality of housings 842 and shafts 846. In the illustrated embodiment each housing 842 and shaft 846 is formed as a hydraulic ram and is pressurized to provide the extension and retraction of the boom 830. In addition, one or more trombones or tubes 848 extends parallel to the housings 842 and shafts 846 and includes fluid passages for conveying pressurized fluid to the end of the boom 830. The tube(s) 848 may be positioned between the housings 842 and shafts 846.

Although various aspects have been described in detail with reference to certain preferred embodiments, variations and modifications exist within the scope and spirit of one or more independent aspects as described. Various features and advantages are set forth in the following claims.

What is claimed is:

1. A boom for supporting a drilling and bolting tool, the boom comprising:

a first portion including a first end and a second end, a longitudinal axis extending between the first end and the second end;

a second portion including a proximal end and a distal end, the second portion supported for translational movement relative to the first portion in a direction parallel to the longitudinal axis, the distal end configured to support the drilling and bolting tool;

a shaft support supporting the second portion for movement relative to the first portion, the shaft support including a piston slidable in the direction parallel to the longitudinal axis, movement of the piston causing the second portion to rotate relative to the first portion about the longitudinal axis;

an actuator for moving the second portion relative to the first portion in the direction parallel to the longitudinal axis; and a fluid passage for conveying pressurized fluid from the first portion through the second portion, the fluid passage positioned within the first portion and the second portion.

2. The boom of claim 1, further comprising a rotary flow distributor positioned within the first portion and in fluid communication with a fluid source, and wherein the fluid passage includes a plurality of conduits extending between the rotary flow distributor and the distal end of the second portion, the plurality of conduits extending through the shaft support.

3. The boom of claim 1, wherein an inner surface of the first portion has a non-circular cross-section as viewed along the longitudinal axis.

4. The boom of claim 3, wherein the inner surface of the first portion includes at least one substantially planar wall, the at least one substantially planar wall providing a torque-reaction surface.

5. The boom of claim 1, wherein the shaft support includes a body, an inner shaft positioned at least partially within the body, and a piston slidably engages an outer surface of the inner shaft, movement of the piston relative to the inner shaft driving the inner shaft to rotate about its longitudinal axis relative to the body.

6. The boom of claim 1, further comprising a rotary actuator and flow distributor secured to the distal end of the second portion, the rotary actuator and flow distributor configured to support the drilling and bolting tool for rotational movement about the distal end, the rotary actuator and flow distributor providing fluid communication from the fluid passage to actuate the drilling and bolting tool.

7. The boom of claim 1, further comprising an elongated guide member secured to the first portion and oriented substantially parallel to the longitudinal axis, the guide member engaging the second portion to guide the second portion for movement relative to the first portion.

8. A drilling and bolting device comprising:

a drilling and bolting tool including a base frame, a feed frame supported for translational movement relative to the base frame, and a rotation unit supported for translational movement relative to the base frame and the feed frame; and a boom including, a first portion including a first end and a second end, a longitudinal axis extending between the first end and the second end, a second portion including a proximal end and a distal end, at least a portion of the second portion positioned within the first portion and supported for translational movement relative to the first portion in a direction parallel to the longitudinal axis, the distal end supporting the drilling and bolting tool, an actuator for moving the second portion relative to the first portion in the direction parallel to the longitudinal axis, a shaft support supporting the second portion for movement relative to the first portion, the shaft support including a piston slidable in the direction parallel to the longitudinal axis, movement of the piston causing the second portion to rotate relative to the first portion about the longitudinal axis, and a fluid passage for conveying pressurized fluid through the boom to actuate the tool, the fluid passage enclosed within the first portion and the second portion.

9. The drilling and bolting device of claim 8, further comprising a rotary actuator and flow distributor secured to the distal end of the second portion and supporting the drilling and bolting tool.

10. The drilling and bolting device of claim 8, further comprising an elongated guide member secured to the first portion and oriented substantially parallel to the longitudinal axis, the guide member engaging the second portion to guide the second portion for movement relative to the first portion.

11. The drilling and bolting device of claim 8, wherein the actuator includes a threaded shaft oriented substantially parallel to the longitudinal axis, the actuator further including a coupler threadably engaging the threaded shaft and coupled to the second portion, rotation of one of the threaded shaft and the coupler causing the coupler to move along the threaded shaft, thereby moving the second portion in the direction parallel to the longitudinal axis.

12. The drilling and bolting device of claim 8, wherein the second portion includes an elongated shaft, wherein the shaft support includes at least one bearing engaging an inner surface of the first portion and supporting the elongated shaft relative to the first portion.

13. The drilling and bolting device of claim 12, further comprising a rotary flow distributor positioned within the first portion and in fluid communication with a fluid source, and wherein a plurality of conduits extend between the rotary flow distributor and the distal end of the second portion, the plurality of conduits extending through the shaft support and the elongated shaft.

14. A boom for supporting a drilling and bolting tool, the boom comprising:

a first portion including a first end and a second end, a longitudinal axis extending between the first end and the second end;

a second portion including a proximal end and a distal end, the second portion supported for translational movement relative to the first portion in a direction parallel to the longitudinal axis, the distal end configured to support the drilling and bolting tool, the second portion at least partially positioned within the first portion;

a shaft support supporting the second portion for movement relative to the first portion parallel to the longitudinal axis, the shaft support including a piston, translational movement of the piston causing the second portion to rotate relative to the first portion about the longitudinal axis; and a fluid passage extending through the first portion and the second portion and configured to convey pressurized fluid to actuate the tool, the fluid passage enclosed within the first portion and the second portion.

15. The boom of claim 14, further comprising a rotary actuator and flow distributor secured to the distal end of the second portion, the rotary actuator and flow distributor configured to support the drilling and bolting tool.

16. The boom of claim 14, further comprising an actuator including a threaded shaft oriented substantially parallel to the longitudinal axis and a coupler threadably engaging the threaded shaft and coupled to the second portion, rotation of one of the threaded shaft and the coupler causing the coupler to move along the threaded shaft, thereby moving the second portion in the direction parallel to the longitudinal axis.

17. The boom of claim 14, wherein an inner surface of the first portion includes at least one substantially planar wall providing a torque-reaction surface.

18. The boom of claim 14, further comprising an actuator including an elongated guide member secured to the first portion and oriented substantially parallel to the longitudinal axis, the guide member engaging the second portion to guide the second portion for movement relative to the first portion.

19. The boom of claim 14, further comprising a chain including a plurality of interconnected links, the chain forming a hollow passage; and a fluid conduit for conveying fluid between an outlet of a rotary actuator and flow distributor and the drilling and bolting tool, the fluid conduit at least partially positioned in the hollow passage.

20. The boom of claim 14, further comprising:

a support bracket supporting the first end of the first portion for pivoting movement, a first rotary flow distributor permitting transfer of fluid while the first portion is pivoted about a first pivot axis;

a second rotary flow distributor permitting transfer of fluid while the first portion is pivoted about a second pivot axis oriented perpendicular to the first pivot axis; and a third rotary flow distributor permitting transfer of fluid while the first portion is pivoted about a third pivot axis oriented perpendicular to the first pivot axis and the second pivot axis.

* * * * *